United States Patent [19]

Chiou et al.

[11] Patent Number: 5,606,165
[45] Date of Patent: Feb. 25, 1997

[54] SQUARE ANTI-SYMMETRIC UNIFORMLY REDUNDANT ARRAY CODED APERTURE IMAGING SYSTEM

[75] Inventors: Walter C. Chiou, North Babylon; Richard C. Augeri, West Hempstead, both of N.Y.

[73] Assignee: AIL Systems Inc., Deer Park, N.Y.

[21] Appl. No.: 586,555

[22] Filed: Jan. 16, 1996

Related U.S. Application Data

[63] Continuation-in-part of Ser. No. 154,733, Nov. 19, 1993.
[51] Int. Cl.⁶ .................................................. G01T 1/202
[52] U.S. Cl. ........................................ 250/363.06; 382/281
[58] Field of Search ...................... 250/363.06; 382/281

[56] References Cited

U.S. PATENT DOCUMENTS

| | | |
|---|---|---|
| 3,961,191 | 6/1976 | Stoner et al. ............................ 378/2 |
| 4,092,540 | 5/1978 | Barrett . |
| 4,146,295 | 5/1979 | Fonrojet et al. . |
| 4,165,462 | 8/1979 | Macovski et al. . |
| 4,209,780 | 6/1980 | Fenimore et al. . |
| 4,360,797 | 11/1982 | Fenimore et al. . |
| 4,370,750 | 1/1983 | Hoover ................................... 378/43 |
| 4,389,633 | 6/1983 | Fenimore . |
| 4,435,838 | 3/1984 | Gourlay . |
| 4,521,688 | 6/1985 | Yin . |
| 4,791,300 | 12/1988 | Yin . |
| 4,891,844 | 1/1990 | Kiri . |
| 5,012,499 | 4/1991 | Vali et al. . |
| 5,099,128 | 3/1992 | Stettner ............................ 250/370.11 |
| 5,103,098 | 4/1992 | Fenyves . |
| 5,122,671 | 6/1992 | Buchanan et al. . |
| 5,144,141 | 9/1992 | Rougeot et al. . |
| 5,171,998 | 12/1992 | Engdahl et al. . |
| 5,235,191 | 8/1993 | Miller . |
| 5,286,973 | 2/1994 | Westrom et al. . |
| 5,308,986 | 5/1994 | Walker . |

FOREIGN PATENT DOCUMENTS

| | | |
|---|---|---|
| 0441521A1 | 8/1991 | European Pat. Off. . |
| 2626679 | 8/1989 | France . |

OTHER PUBLICATIONS

M. L. McConnell et al., "A Coded Aperture Gamma Ray Telescope", *IEEE Transaction on Nuclear Science*, vol. NS–29, No. 1, pp. 155–159 (1982).

(List continued on next page.)

*Primary Examiner*—Constantine Hannaher
*Attorney, Agent, or Firm*—Hoffmann & Baron

[57] ABSTRACT

A square anti-symmetric uniformly redundant array coded aperture includes transparent and opaque cells and exhibits a normal mask pattern at a first position and a complementary mask pattern when rotated to a second position rotationally offset by 90° from the first position. The coded aperture is utilized in a coded aperture imaging system for imaging a source of non-focusable radiation such as a gamma ray or x-ray emitting source. Such a coded aperture imaging system basically includes a square anti-symmetric uniformly redundant array coded aperture for receiving radiation emitted by a source and generating a first coded shadow therefrom at the first position, and a second coded shadow therefrom at the second position, a rotating platform and motor for rotating the coded aperture between the first and second position, a position sensitive detector situated with respect to the coded aperture to allow the first and second coded shadows to sequentially impinge on the detector, the detector respectively generating a first coded optical signal and a second coded optical signal in response thereto, an optical signal convertor responsive to the first and second coded optical signals and respectively generating a first coded electrical signal and a second coded electrical signal in response thereto and a signal processor responsive to the first and second coded electrical signals and decoding the coded electrical signals to generate an image signal which is representative of an image of the source of non-focusable radiation.

9 Claims, 12 Drawing Sheets

OTHER PUBLICATIONS

A. J. Dean, "Imaging Systems For Low Energy γ-ray Astronomy", *Nuclear Instruments and Methods in Physics Research,* 221, pp. 265–277 (1984).

J. L. Matteson, "The Nuclear Astrophysics Explorer", *Adv. Space Res.,* vol. 11, No. 8, pp. (8)369–(8)378 (1991).

Donald A. Kniffen, "The Gamma–Ray Universe", *American Scientist,* 81, pp. 342–349 (Jul.–Aug. 1993).

Ziock, et al., "A Gamma–Ray Imager for Arms Control", *IEEE Transactions on Nuclear Science,* 39, No. 4, (1992).

Garcia, et al., "Development of the EXITE detector: A new Imaging Detector for 20–300 keV Astronomy", *IEEE Transactions on Nuclear Science,* 33, No. 1, (Feb. 1986).

Roziere, et al., "Large–Field–of–View Image–Intensifier Gamma–Camera Detectors Using A Silicon X Y Scintillation Localizer", *IEEE Transactions on Nuclear Science,* NS–28, No. 1, (Feb. 1981).

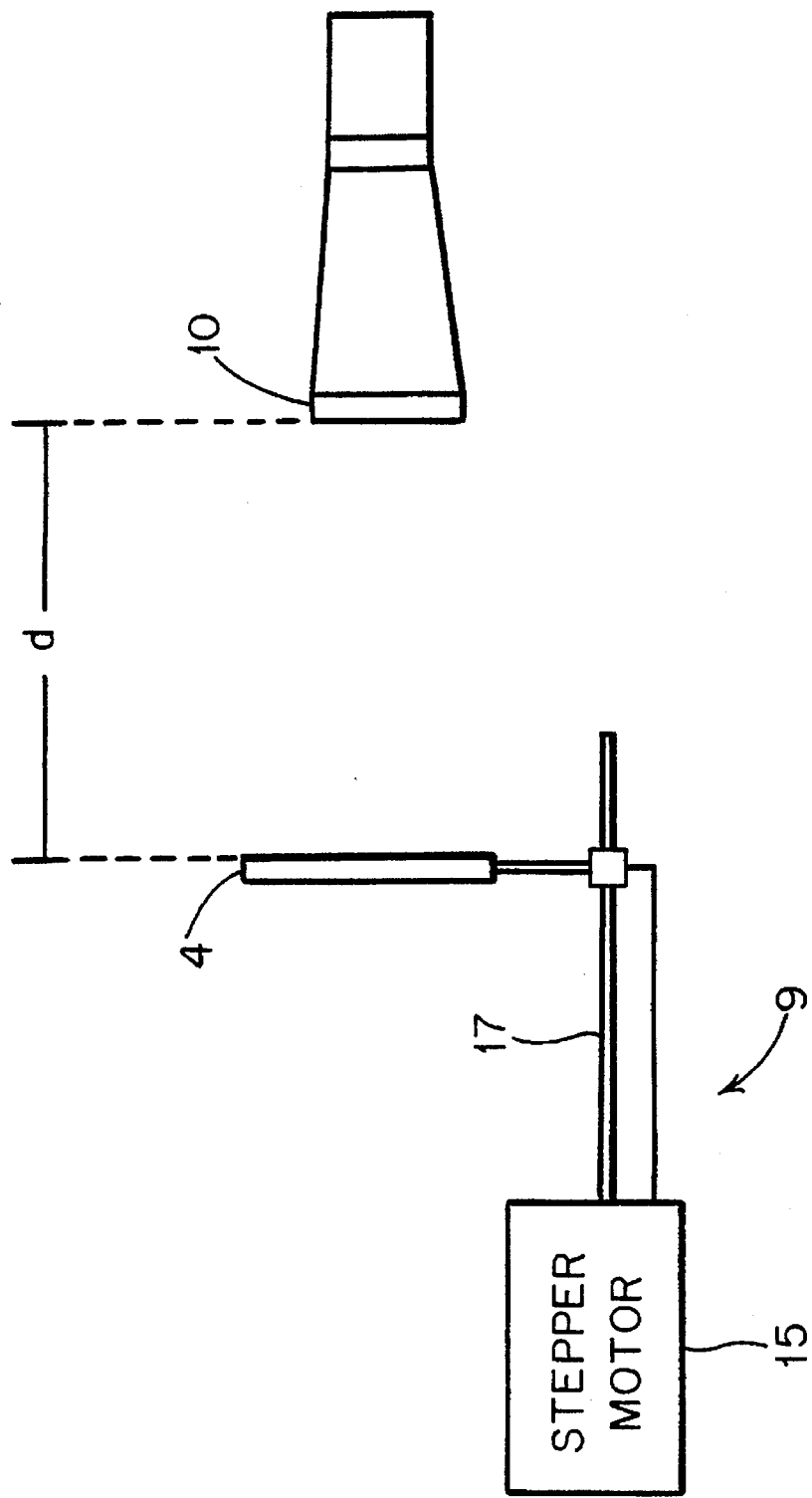

SQUARE ANTI-SYMMETRIC UNIFORMLY REDUNDANT ARRAY CODED APERTURE IMAGING SYSTEM

CROSS REFERENCE TO RELATED APPLICATIONS

This is a continuation-in-part of co-pending application Ser. No. 08/154,733, filed Nov. 11, 1993, entitled "Gamma Ray Imaging System".

BACKGROUND OF THE INVENTION

1. Field of the Invention

The present invention relates to a coded aperture imaging system, and more particularly relates to a coded aperture imaging system for generating and displaying an image signal which is representative of an image of a source of non-focusable radiation, such as a gamma ray or an x-ray emitting source. More particularly, the invention relates to a uniformly redundant array coded aperture used in a coded aperture imaging system, and a method of generating the coded aperture.

2. Description of the Prior Art

Nonfocusable radiation sources, such as gamma ray and x-ray emitting sources, are most commonly found in nuclear power plants, medical radiological laboratories, and other nuclear material handling facilities. Thus, routine monitoring of potential highly radioactive areas must be performed during nuclear power plant operation. Environmental restoration and waste management of radiation contaminated sites also require detecting and locating contaminants to assure restoration of the environment to a safe level. Additionally, in order to perform repairs and maintenance within nuclear power plants, the area to be worked in must be scanned by health physics personnel to determine an amount of exposure the radiation workers will encounter while performing their job. Worker radiation exposure is closely monitored via personally worn dosimetry and radiation workers who have reached government specified radiation exposure limits are prevented from further exposure and can no longer perform their jobs for a specified period of time. Thus, it is extremely beneficial, and it is the goal of all nuclear power plant operators, to minimize personal radiation exposure so that radiation exposure limits are not reached.

The health physics personnel responsible for scanning a potentially highly radioactive area often wear protective clothing and a respirator to protect them against airborne radiation. The scanning of suspected high radiation areas with a well known device called a Geiger-Mueller counter is necessary to locate sources of high radiation. Geiger-Mueller counters are relatively small and carried by the worker performing the scanning process. In some instances, the Geiger-Mueller counter is attached to a pole so that the worker can maintain a safe distance from radioactive equipment when scanning. The worker manually scans the entire area to determine "hot spots" or areas of high radiation.

Upon completion of the scanning process, the worker creates a map of the radiation hazards which have been identified by the scanning process using the Geiger-Mueller counter. Appropriate shields are placed around those high radiation sources to protect the workers. Based upon the results of the scanning process, radiation workers performing repairs and maintenance are instructed how long they can remain in the area and what equipment should be avoided due to high levels of radiation being emitted. Furthermore, the scanning process is time consuming because the sweep rate, i.e., the rate at which the Geiger-Mueller counter handpiece is moved over a radioactive source, is relatively slow. In some instances, the worker must get close to the gamma ray emitting source to obtain proper readings since typical Geiger-Mueller counters are not very sensitive.

The two most important factors in limiting radiation exposure are time of exposure and distance from the source of radiation. Presently available scanning techniques using a Geiger-Mueller counter are inefficient in minimizing time of radiation exposure and maximizing distance from the source of radiation. Additionally, the scanning process using a Geiger-Mueller counter provides crude "hot spot" location.

Prior art system designs utilizing the technique of coded aperture imaging have attempted to improve upon the disadvantages of this early scanning technique. Generally, by providing a system which generates a visual representation of the non-focusable radiation source, coded aperture imaging systems allow detection and location of such sources while minimizing, or even eliminating, harmful exposure by personnel. In particular, coded aperture imaging, besides providing the above identified advantage, also yields accurate images of sources of non-focusable radiation. Coded aperture imaging is itself a well known technique involving the use of an aperture composed of transparent and opaque cells. A shadow is cast through these cells on a position sensitive detector in response to the aperture being exposed to gamma or x-ray radiation sources. An image of the source is reconstructed from the information obtained during this exposure process.

However, such prior art coded aperture imaging systems have historically exhibited severe limitations. For example, very often, position sensitive detectors of coded aperture imaging systems are plagued by substantial instrument noise. In addition, the systems often operate in a high background radiation environment, and high energy photons emanating from outside the instrument field of view are detected by the position sensitive detector without first passing through, or being modulated by, the coded aperture. Thus, detected photons not modulated by the coded aperture and inherent non-modulated instrument noise degrade the signal-to-noise ratio of the instrument, resulting in poor image quality and low sensitivity.

Some prior art coded aperture imaging systems utilize an active shield technique to minimize the detrimental effect of non-modulated photons. Under this approach, if the incoming high energy photon flux is low enough to allow the instrument to count individual photon arrival, an active shield and an active coded aperture can be used to provide a means for coincidence/anti-coincidence identification. Thus, non-modulated photons can be individually identified and then excluded, or vetoed, during image reconstruction. However, if the photon flux increases such that many photons arrive at the detector simultaneously, accurate arrival time of each photon cannot be established thereby making separation of non-modulated photons from the desired modulated photons very difficult.

Other prior art coded aperture imaging systems have overcome this limitation by utilizing a normal/complementary coded aperture approach. Under this approach, the radiation source is first modulated by a coded aperture, called a normal aperture, and then by the complement of the coded aperture, called a complementary aperture. The complementary aperture is created by exchanging the location of the cells on the normal aperture. In other words, all cells that were transparent on the normal aperture are opaque on the complementary aperture, and all cells that were opaque on the normal aperture are transparent on the complementary aperture. If each aperture is exposed to the source for an equal time duration and a cancelling process is performed between the images modulated by each aperture, the detrimental effects of non-modulated photons and instrument background noise can be significantly reduced. This result is obtained even in the presence of a high energy photon flux. Coded aperture imaging systems that use this above approach have employed coded apertures formed from either rectangular or hexagonal uniformly redundant arrays (URA).

Rectangular URA coded apertures, such as those disclosed in U.S. Pat. No. 4,209,780 to Fenimore, et al. and U.S. Pat. No. 5,036,546 to Gottesman, et al., have been used for coded aperture imaging. However, use of these types of apertures requires the physical implementation of two separate apertures, one functioning as the normal aperture and the other utilizing as the complementary aperture. Systems utilizing rectangular URAs must include means for switching between apertures during the imaging process. This switching process can lead to system inaccuracies, namely, alignment inaccuracy which will negatively affect the image reproduction performance of the system. Also, if the aperture switching is accomplished manually, one of the major benefits that a coded aperture imaging system has over a Geiger-Mueller counter, namely, protection of personnel from radiation exposure, is completely lost. Further, manual aperture switching is time-consuming and detracts from the additional benefit of being able to quickly identify and contain dangerous sources of radiation.

A hexagonal URA was subsequently developed to overcome the need for two separate apertures, as disclosed by M. H. Finger and T. A. Prince, in an article entitled "Hexagonal Uniformly Redundant Arrays for Coded Aperture Imaging", Proceedings of the 19th International Cosmic Ray Conference, OG 9.2-1, pages 295–298 (1985). A single hexagonal URA (HURA) coded aperture, which is nearly anti-symmetric about its hexagonal axis, can function both as a normal aperture and a complementary aperture upon 60° rotation. A HURA coded aperture is congruous for a hexagonal or circular position sensitive detector. However, a severe disadvantage exists in the use of such an aperture with a Cartesian-configured position sensitive detector. Since matching of the hexagonal geometry of the aperture with the Cartesian geometry of the detector requires significant geometric manipulation, considerable data formatting must be performed by the imaging system. Because most state-of-the-art detectors are of a Cartesian configuration, the use of a HURA coded aperture is limited.

Accordingly, there is a need for a portable, reliable, coded aperture imaging system which can automatically map out "hot spots" in an area to be monitored. Furthermore, it would be advantageous to have a device which can be permanently mounted in an area to provide a map of the radiation environment in an area with no radiation exposure to human beings. Still further, there is a need for an imaging system which incorporates a uniformly redundant array coded aperture, having an automatically complementary property, which can easily be interfaced with a readily available Cartesian-configured (rectangular or square) position sensitive detector.

OBJECTS AND SUMMARY OF THE INVENTION

It is an object of the present invention to provide an automatic coded aperture imaging system which can display an image representative of an image of a gamma ray emitting source.

It is another object of the present invention to provide a reliable device which can be permanently mounted in an area to provide a display of an image representative of an image of a gamma ray emitting source.

It is yet another object of the present invention to provide a device for mapping radiation "hot spots" while minimizing human exposure to radiation hazards.

It is still a further object of the present invention to provide a device for providing real-time surveillance of radiation hazardous areas.

It is yet another object of the present invention to provide a portable device for monitoring and locating potential hazardous radioactive sources and material in the nuclear industry and to safeguard the safety and health of personnel working in the industry and the populace residing in surrounding areas.

It is still a further object of the present invention to provide a coded aperture imaging system for use at security check points to detect the illegal transportation and removal of nuclear materials.

It is yet another object of the present invention to provide a coded aperture imaging system which is affordable, rugged, reliable and user-friendly.

It is still a further object of the present invention to provide an imaging system for imaging both gamma and x-ray emitting sources from a safe distance.

It is yet another object of the present invention to provide a coded aperture imaging system to perform x-ray tomography.

It is still a further object of the present invention to provide a coded aperture for improved coded aperture imaging.

It is yet another object of the present invention to provide a coded aperture which can function both as a normal aperture and a complementary aperture in an imaging system utilizing a Cartesian-configured position sensitive detector.

It is still a further object of the present invention to provide a coded aperture which has nearly 50% throughput.

It is yet another object of the present invention to provide a coded aperture which is anti-symmetric upon 90° rotation with the exception of a center cell.

It is still a further object of the present invention to provide a method for producing a coded aperture for improved coded aperture imaging.

It is yet another object of the present invention to provide a method for producing a coded aperture which can function both as a normal aperture and a complementary aperture in an imaging system utilizing a Cartesian-configured position sensitive detector.

It is still a further object of the present invention to provide a coded aperture imaging system which utilizes a coded aperture capable of functioning both as a normal aperture and a complementary aperture, and also utilizes a Cartesian-configured position sensitive detector.

In accordance with one form of the present invention, a coded aperture imaging system for providing an image of a gamma ray emitting source includes a coded aperture, a position sensitive detector, an array of charge coupled devices and a signal processor. The position sensitive detector may consist of a high spatial resolution radiation detector. In an alternative embodiment, an array of semiconductor photodiodes may be used in place of the array of charge coupled devices. The array of photodiodes functions in a similar manner to the array of charge coupled devices. It is to be appreciated that other types of low noise sensitive optical imaging assemblies known to persons of ordinary skill in this art may be employed.

The coded aperture is used to spatially modulate gamma rays emitted by a source. The coded aperture generates a coded shadow in response to the gamma rays received by the aperture. The position sensitive detector is situated with respect to the coded aperture to allow the coded shadow generated by the aperture to impinge on the detector. The position sensitive detector generates a coded optical signal in response to the coded shadow impinging on the position sensitive detector. The array of charge coupled devices is responsive to the coded optical signal and generates a coded electrical signal from the optical signal. The signal processor is responsive to the coded electrical signal and decodes the coded electrical signal and generates an image signal therefrom. The image signal is representative of an image of a gamma ray emitting source.

The coded aperture imaging system may also include means responsive to the image signal for displaying a representative image of the gamma ray emitting source. The image signal responsive means may be a cathode ray tube or a solid state display panel, similar to a monitor used in a television and a computer. Furthermore, the coded aperture imaging system may include means for transferring the coded optical signal from the position sensitive detector to the array of charge coupled devices. The transferring means may be either an array of fiber optic tapers or relay optics, or the like.

The coded aperture imaging system of the present invention may still further include an image intensifier. The image intensifier is interposed between the position sensitive detector and the array of charge coupled devices. The image intensifier amplifies and intensifies the coded optical signal to provide increased sensitivity to the system. The image intensifier may be in the form of an image intensifier tube or a microchannel image intensifier.

The coded aperture of the coded aperture imaging system includes areas of non-focusable radiation transparency and opacity. The coded aperture may be in the form of a uniformly redundant array or any other type of coded array, but is preferably in the form of a square anti-symmetric uniformly redundant array, as will be described in greater detail.

The position sensitive detector of the coded aperture imaging system may be a glass scintillator or a glass fiber scintillator. The glass fiber scintillator includes a plurality of glass fibers and the glass fibers preferably include an external mural absorber coating on the glass fibers to minimize cross-talk between the fibers. In alterative embodiments, the position sensitive detector may be formed from a plastic fiber scintillator or a crystal scintillator.

The coded aperture imaging system of the present invention is optimally designed to provide a maximum field of view of the area being monitored as well as good spatial resolution. The good spatial field of view may be attained by inclusion of an external mural absorber coated fiber scintillator in the coded aperture imaging system. To maximize the field of view, the coded aperture includes a cross-sectional area which is approximately two times the cross-sectional area of the position sensitive detector. The field of view preferably ranges from about 1 degree to about 45 degrees.

The imaging system described above can also be used to provide an image of an x-ray emitting source. Accordingly, the imaging system may be useful in the field of nuclear medicine, and more specifically in the field of x-ray tomography or nuclear radiography.

The present invention also discloses a method of generating a representative image of a gamma ray emitting source. The method includes the steps of providing a coded aperture imaging system including a coded aperture, a position sensitive detector, an array of charge coupled devices and a signal processor, each of which functions as previously described, situating the coded aperture imaging system so that a gamma ray emitting source is within the field of view of the system, and displaying an image signal generated by the signal processor, the displayed image signal being representative of an image of the gamma ray emitting source.

The method may further include creating a visual overlay of an area in the field of view of the system and displaying the image signal in conjunction with the visual overlay of the area. In this manner, the gamma ray image is superimposed on a pictorial overlay of the area and "hot spots" can be easily determined. The above-described method may also be used for imaging an x-ray emitting source.

An alternative embodiment of the coded aperture imaging system includes a coded aperture, a position sensitive detector and a signal processor. The coded aperture receives gamma rays emitted by a source and generates a coded shadow. The position sensitive detector is situated with respect to the coded aperture to allow the coded shadow to impinge thereon. The position sensitive detector includes an array of semiconductor gamma ray detectors which generates a coded electrical signal in response to the coded shadow impinging thereon. The signal processor is responsive to the coded electrical signal and decodes the coded electrical signal to generate an image signal which is representative of an image of the gamma ray emitting source.

A preferred alternative embodiment of the present invention includes a coded aperture in the form of a square anti-symmetric uniformly redundant array. A square anti-symmetric uniformly redundant array coded aperture has the beneficial characteristic of having nearly 50% throughput where almost half of the aperture area is transparent thereby allowing non-focusable radiation to freely pass. In addition, such aperture is anti-symmetric, or complementary, upon rotation by 90°, except for a center cell. Thus, a system utilizing a square anti-symmetric uniformly redundant array coded aperture yields improved image reconstruction, by minimizing the effect of non-modulated photons and instrument background noise, while also realizing the cost savings of requiring only one coded aperture for image processing. Further, since most of the state-of-the-art position sensitive detectors are Cartesian-configured, a system utilizing a square anti-symmetric uniformly redundant array coded aperture may employ such detectors and avoid cumbersome data formatting as would be required in systems using apertures and detectors of dissimilar geometric characteristics.

Accordingly, the present invention discloses a square anti-symmetric uniformly redundant array coded aperture including transparent and opaque cells and exhibiting a square normal mask pattern in a first position and a square complementary mask pattern when rotated to a second position, the second position being rotationally offset by 90° from the first position.

The present invention further discloses a coded aperture imaging system utilizing a square anti-symmetric uniformly redundant array coded aperture. Such an imaging system includes a square anti-symmetric uniformly redundant array coded aperture for receiving radiation emitted by a source and generating a first coded shadow therefrom at the first position and a second coded shadow therefrom at the second position, rotating means for rotating the coded aperture between the first and second position, a position sensitive detector situated with respect to the coded aperture to allow the first and second coded shadows to sequentially impinge on the detector, the detector respectively generating a first coded optical signal and a second coded optical signal in response thereto, converting means responsive to the first and second coded optical signals and respectively generating a first coded electrical signal and a second coded electrical signal in response thereto and a signal processor responsive to the first and second coded electrical signals and decoding the coded electrical signals to generate an image signal which is representative of an image of the source of non-focusable radiation. It is to be understood that the position sensitive detector may also integrally include the above-mentioned converting means.

The coded aperture imaging system utilizing the square anti-symmetric uniformly redundant array coded aperture may also include rotating means which itself includes an aperture retaining platform for retaining the coded aperture in an at least first and at least second position, a position encoder responsive to the position of the platform for generating a position signal in response thereto, a drive control unit responsive to the position signal for generating a drive control signal in response thereto, and a stepper unit responsive to the drive control signal for rotating the platform between the at least first and at least second positions.

The coded aperture imaging system utilizing the square anti-symmetric uniformly redundant array coded aperture may also include a display, the display including a visual representation of an area in the field of view of the imaging system and wherein the representative image of the source of non-focusable radiation responsive to the image signal is superimposed on the visual representation.

The coded aperture imaging system utilizing the square anti-symmetric uniformly redundant array coded aperture may also include a data storage unit, the data storage unit being electrically coupled to the signal processor, the signal processor generating data, the data storage unit storing the data from the signal processor.

The coded aperture imaging system utilizing the square anti-symmetric uniformly redundant array coded aperture may also include means for adjusting a separation distance between the coded aperture and the position sensitive detector. The adjusting means may be operatively coupled to the coded aperture or the position sensitive detector or both. Accordingly, the adjusting means moves either the aperture or the detector or both, with respect to the other, thereby adjusting the separation distance.

The coded aperture imaging system utilizing the square anti-symmetric uniformly redundant array coded aperture may also include signal processing electronics. The signal processing electronics may process the coded electrical signal to generate an image of the gamma or x-ray sources from the detected coded gamma or x-ray radiation. Further, the signal processing electronics may also function as an image processor to improve the quality of the gamma and x-ray images. Still further, the signal processing electronics may control the rotation and translation of the square anti-symmetric uniformly redundant array coded aperture. The signal processing electronics may also provide a means for storing the visual image data and overlaying the gamma or x-ray image with the visual image and displaying them on the monitor screen.

A preferred form of the coded aperture imaging system, as well as other embodiments, objects, features and advantages of this invention will be apparent from the following detailed description of illustrative embodiments thereof, which is to be read in connection with the accompanying drawings.

BRIEF DESCRIPTION OF THE DRAWINGS

FIG. 2a is a simplified side view and block diagram of one embodiment, formed in accordance with the present invention, for adjusting the separation distance between the coded aperture and the position sensitive detector.

DETAILED DESCRIPTION OF THE PREFERRED EMBODIMENTS

Figure 1:
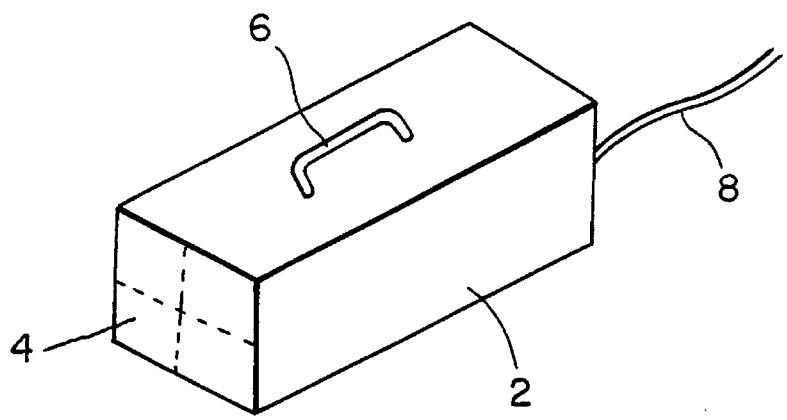
FIG. 1 is a side perspective view of a portable portion of a coded aperture imaging system formed in accordance with the present invention.

A coded aperture imaging system formed in accordance with the present invention offers a unique system to enhance health and safety and reduce potential hazards associated with gamma ray emitting sources, particularly in nuclear power plant and nuclear contaminated site restoration operations. Presently available techniques for monitoring and mapping potential radiation hazardous locations are inefficient, time-consuming and subject workers to unnecessary radiation exposure. Conventional scanning techniques involve the use of a Geiger-Mueller counter to manually scan a location to determine "hot spots" or sources emitting large doses of gamma radiation. The coded aperture imaging system of the present invention is orders of magnitude more efficient than the conventional method of manual scanning with a Geiger-Mueller counter for locating hazardous radiation and gamma ray emitting sources.

The coded aperture imaging system provides a device which can be permanently installed for continuous monitoring or which can be deployed in a hand-held unit as needed. The coded aperture imaging system alleviates the problems associated with manual scanning by workers and enables a real-time surveillance of "hot spots" or highly radioactive areas. In one application, the coded aperture imaging system may be strategically installed in a containment chamber of a nuclear power plant to produce a gamma ray image which can be overlaid on a visual image of the area to pinpoint potential radiation hazards. Thus, potential radiation contaminated structures can be identified in real-time and required corrective actions can be undertaken immediately. Additionally, permanently installed coded aperture imaging systems formed in accordance with the present invention may eliminate the need for exposure to radiation hazards by personnel performing routine inspections in potentially hazardous areas.

The coded aperture imaging system formed in accordance with the present invention may be useful in the nuclear power and nuclear material production and processing industries, nuclear waste management, the decommissioning of nuclear reactors, in nuclear powered vessels, in scientific facilities and even in nuclear medical applications such as nuclear radiology. The imaging system of the present invention can also be used at security check points to detect the smuggling of nuclear materials. In effect, the applications for using the coded aperture imaging system of the present invention are rather expansive.

The coded aperture imaging system formed in accordance with the present invention provides a rugged, real-time, imaging system that is affordable, portable and user-friendly for effective monitoring of areas of hazardous radiation, including both x-rays and gamma rays. Such a system is presently not available in the marketplace. Imaging systems for astronomical observation of celestial bodies emitting high energy have been successfully developed by NASA; however, these systems are bulky, expensive, difficult to operate and used exclusively for astronomical observations. They are not suitable as environmental radiation monitors because of their size, cost, operating complexity and weight.

Referring to FIG. 1, a coded aperture imaging system formed in accordance with the present invention generally includes a protective case or housing 2 which encloses a coded aperture 4, a position sensitive detector and an array of charge coupled devices. In an alternative embodiment, an array of semiconductor photodiodes can be used in place of the array of charge coupled devices; however, the preferred embodiment utilizes an array of charge coupled devices. The housing may include a handle 6 for portability of the device. A cable 8 has one end coupled to the array of charge coupled devices and an opposite end coupled to a remote image processing location.

Figure 2:
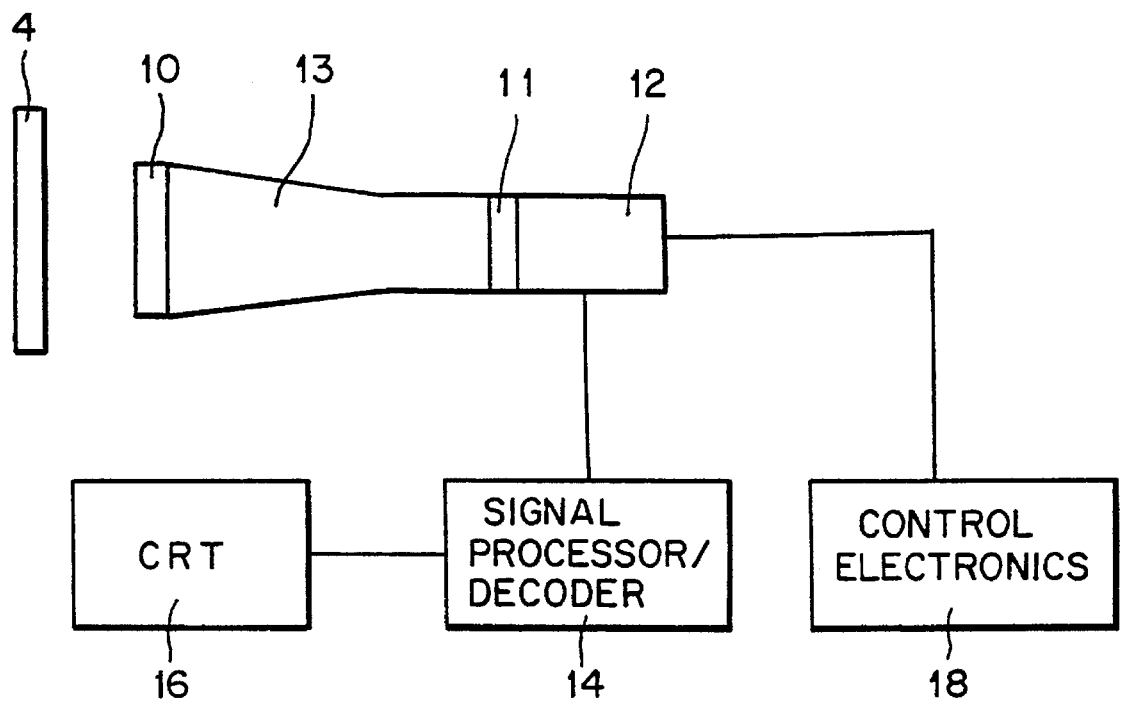
FIG. 2 is a functional block diagram of a coded aperture imaging system formed in accordance with the present invention.

FIG. 2 illustrates a functional block diagram of a coded aperture imaging system formed in accordance with the present invention. The coded aperture imaging system generally includes a coded aperture 4, a position sensitive detector 10, an optical train 13, an image intensifier 11, an array of charge coupled devices 12 and a signal processor/decoder 14. The coded aperture 4 provides approximately 50 percent transparency to gamma rays emitted by a source and received by the coded aperture. The coded aperture 4 generates a coded shadow in response to the gamma rays received by the aperture. The position sensitive detector 10 is situated with respect to the coded aperture 4 to allow the coded shadow generated by the aperture to impinge on the position sensitive detector. The position sensitive detector 10 generates a coded optical signal in response to the coded shadow impinging on the detector. The optical train 13 optically couples the position sensitive detector to the array of charge coupled devices 12 which are responsive to the coded optical signal generated by the position sensitive detector and generates a coded electrical signal. The coded electrical signal is received by a signal processor 14 which processes and decodes the coded electrical signal and generates an image signal therefrom. The image signal is representative of an image of the gamma ray emitting source and may be displayed on a cathode ray tube 16 or the like. The embodiment illustrated in FIG. 2 also includes control electronics 18 for controlling the array of charge coupled devices.

In an alternative embodiment, the position sensitive detector 10 includes an array of semiconductor gamma ray detectors. The array of gamma ray detectors is adapted to receive the coded shadow and generate a coded electrical signal in response to the coded shadow impinging thereon. The array of gamma ray detectors formed in accordance with the present invention includes an integral semiconductor device having the inherent properties of a scintillating material and an array of charge coupled devices to convert the coded shadow to a coded electrical signal.

Figure 3:
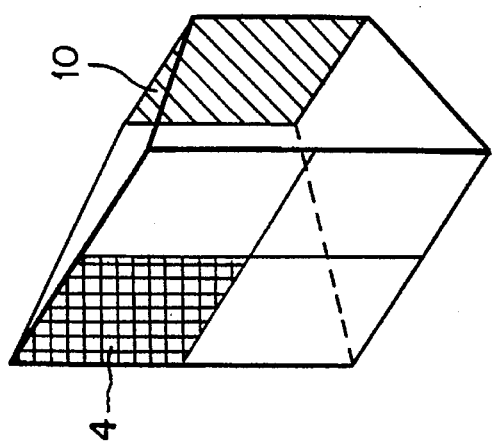
FIG. 3 is a perspective view illustrating the arrangement of the coded aperture with respect to the position sensitive detector.

The coded aperture 4 may be an aperture based on a uniformly redundant array or any other type of coded array, but is preferably based on a square anti-symmetric uniformly redundant array formed in accordance with the present invention, as will be described later in greater detail. In one particular embodiment of the present invention, the coded aperture 4 is based on a uniformly redundant array design. This type of aperture offers relatively high transparency (approximately 50 percent) and a high signal-to-noise ratio. The coded aperture 4 is made from lead or other high density material and may consist of a 2×2 mosaic of the basic coded array. The arrangement of the aperture 4 relative to the position sensitive detector 10 is shown in FIG. 3.

The field of view of the coded aperture imaging system is dependent upon the arrangement of the coded aperture 4 relative to the position sensitive detector 10. For example, the largest field of view is achieved by the shortest aperture to position sensitive detector separation. A preferred embodiment of the coded aperture imaging system includes means for adjusting the separation distance between the coded aperture and the position sensitive detector, such as a track system (not shown) whereby the coded aperture (or position sensitive detector) is slidable on a track.

Referring to FIG. 2a, one embodiment, formed in accordance with the present invention, for adjusting this separation distance, is illustrated. A linear motor assembly 9 is composed of a stepper motor 15 and a lead screw 17. The coded aperture 4 is operatively mounted on the lead screw 17 such that when the stepper motor 15 precisely rotates the lead screw 17, the coded aperture 4 moves in a direction toward or away from the position sensitive protector 10, thereby varying the separation distance, d, between the coded aperture 4 and the position sensitive detector 10. It is to be appreciated that in an alternative embodiment, the position sensitive detector 10 is operatively mounted on the lead screw 17, while the coded aperture 4 remains in a fixed position. Also, it is to be understood that the adjusting means described above, may be embodied inside the housing 2 illustrated in FIG. 1.

Accordingly, by adjusting the separation distance, the device may include a zoom feature, for example, of 1.5 times. In order to achieve the zoom feature, the distance separating the coded aperture 4 and position sensitive detector 10 is increased by a predetermined amount dependent upon the desired magnification.

As shown in FIG. 3, the coded aperture 4 includes two cycles of a basic coded array and is approximately twice the size in cross-sectional area of the position sensitive detector 10 to maximize the fully coded field of view. As previously mentioned, the fully coded field of view is a function of the aperture size and the separation distance between the coded aperture 4 and the position sensitive detector 10. The field of view preferably ranges from approximately a few degrees to about 45 degrees.

Since the aperture 4 is made from a high density material, it is desirable to limit the size and thickness of the aperture due to weight considerations. High opacity required for the opaque portion of the coded aperture requires the use of a thick aperture. One embodiment of the coded aperture imaging system may include a coded aperture having a uniformly redundant array in the form of 17×19 basic array configuration in a 2×2 mosaic. As an example, the aperture may be approximately 4 inches×6 inches and have a thickness of approximately 1 cm to 1.5 cm. The described aperture has an aperture opacity of approximately 0.5 to 0.8 at 1.3 Mev. It is desirable for opacity to be as close to unity as possible.

The coded aperture, which consists of an array of opaque and transparent cells, is placed between the emitting sources and a position sensitive detector plane. Every object element emitting gamma rays within the field of view projects a shadow of the aperture on the detection plane or position sensitive detector 10.

Figure 4:
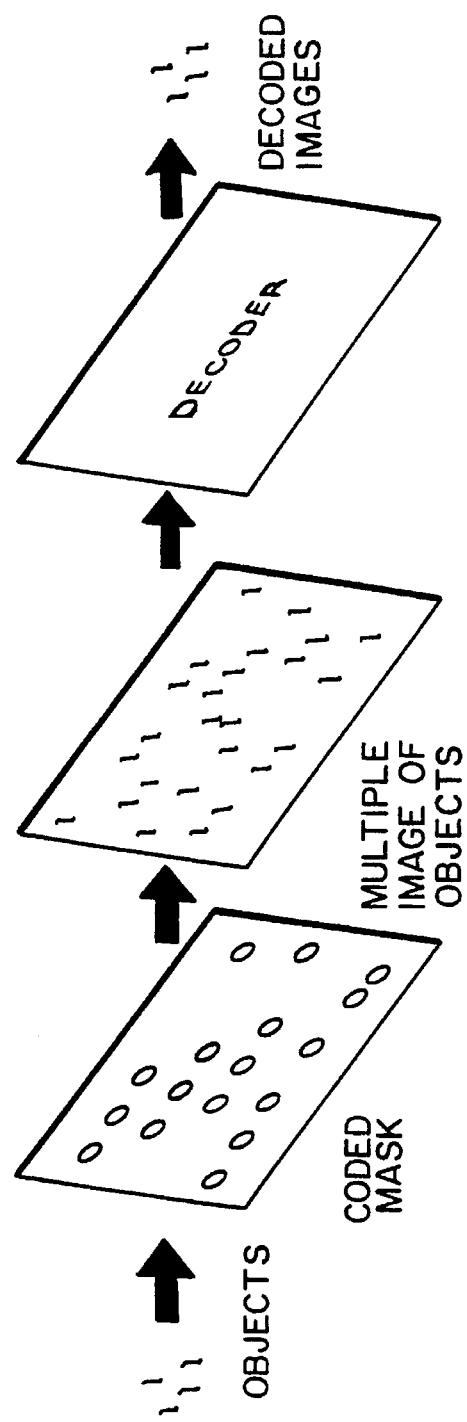
FIG. 4 is a simplified perspective view of a coded aperture, coded shadow and image of a gamma ray source recovered by signal processing and decoding in accordance with the present invention.

FIG. 4 is a simplified perspective view of a coded aperture design and the coded shadow formed on the position sensitive detector 10. The coded aperture forms multiple image shadows on the position sensitive detector 10. The position sensitive detector 10 generates an optical signal in response to the multiple image shadows, and the coded optical signal is subsequently converted to a coded electrical signal which is decoded to provide a decoded image signal representative of the initial rays received by the coded aperture 4. As previously described, the aperture 4 may include two cycles of the basic coded array and the position sensitive detector 10 is approximately one half the size of the aperture. This configuration provides for a uniform sensitivity over the entire fully coded field of view since the overall transparency of the working zone within the fully coded field of view is constant.

Figure 5:
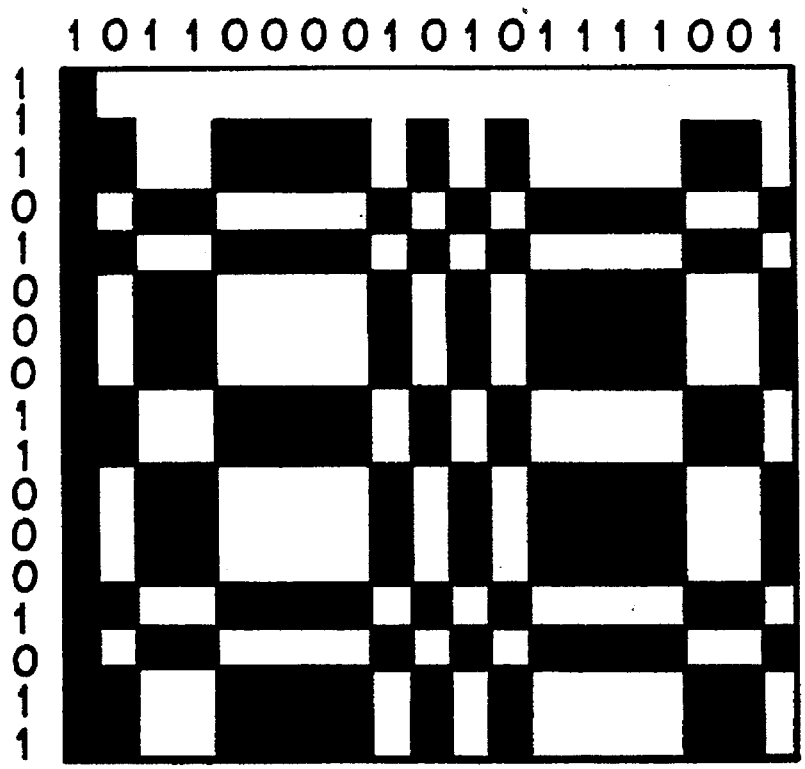
FIG. 5 is a diagrammatic representation of a coded aperture having a 17×19 uniformly redundant array formed in accordance with one embodiment of the present invention.

FIG. 5 illustrates an example of a basic 17×19 uniformly redundant array coding. The dark portions of the aperture shown in FIG. 5, and in similar figures to follow, represent areas of opacity and the light portions represent areas of transparency. The coded aperture shown consists of a 2×2 mosaic of the basic coded array, with one row and one column excluded to avoid intrinsic ambiguities. A uniform redundant array (URA) coding has been developed by Fenimore, et al. and described in U.S. Pat. Nos. 4,209,780 and 4,360,797 both of which are entitled "Coded Aperture Imaging With Uniformly Redundant Arrays", the disclosures of which are incorporated herein by reference. However, as previously discussed, URA's as disclosed by Fenimore and as illustrated in FIG. 5 must include means for switching between normal and complementary apertures during the imaging process. This switching process may lead to alignment inaccuracies as well as radiation exposure of personnel.

Generally, a URA is mathematically based on cyclic difference sets. A cyclic difference set $\Delta(v,\kappa,\lambda)$ of order $v$ is a sequence of $\kappa$ residues, modulus $v$, such that for any residue $\rho \neq 0 \pmod{v}$, the congruence:

$$\delta_i - \delta_j = \rho \pmod{v}$$

admits $\lambda$ solution pairs $(\delta_i, \delta_j)$ with $\delta_i$ and $\delta_j$ in $\Delta$. It It binary $\{\alpha_i\}$ of length $v$, wherein $\alpha_i$ takes the value 1 if i belongs to cyclic difference set $\Delta$ and 0 otherwise. Of these sets, $\kappa$ of them are closed (0) and $v-\kappa$ are open (1). The autocorrelation function of this binary sequence is a single peak on a perfectly flat background. AURA is generated by packing these one dimensional sequences into two dimensional arrays whose autocorrelation functions have the same attribute. It is to be appreciated that the spacing between occurrences of 1's (i.e., one space, two spaces, etc.), will occur a constant number, $\lambda$, of times for all URAs.

A Hadamard set is characterized by the parameters $v=4n-1$, $\kappa=2n-1$, $\lambda=n-1$ for some integer n. The name of these sets is derived from their connection with Hadamard matrices. The known Hadamard sets can be classified not only by the order $v$, but also by their construction method. The construction of Hadamard cyclic difference sets used in this invention is based on quadratic residues B of order $v$. If the order $v$ is a prime number, the set B is generated by the residue (mod of the squares of the first $(v-1)/2$ integers. Element $B_i$ is 1 if i is a quadratic residue and 0 if i is not a residue, and i equals 1 to $v$.

Skew-Hadamard cyclic difference sets are anti-symmetric and are a subset of Hadamard difference sets and of prime order $v=3 \pmod{4}$. They can also be generated from the quadratic residues (mod $v$) as described above.

Skew-Hadamard URAs are subsets of Hadamard URAs and are nearly anti-symmetric. All skew-Hadamard URAs have a cyclic group $\Delta$, and therefore can be constructed from skew-Hadamard cyclic difference sets. From this definition, it can be seen that the skew-Hadamard URA has a transparency, or throughput, of almost 50 percent.

Thus, in a preferred embodiment, the coded aperture is a square anti-symmetric uniformly redundant array, and the construction of a square anti-symmetric uniformly redundant array coded aperture follows the procedure described herein.

The square anti-symmetric uniformly redundant array coded aperture is composed of interconnected and self-supported transparent and opaque cells. It should be noted that the material composition of the transparent and opaque cells is chosen for its ability to either allow non-focusable radiation to be transmitted therethrough, in the case of transparent cells, or prevent radiation from being transmitted therethrough, in the case of opaque cells. The coded aperture of the present invention exhibits a full mask pattern in accordance with the placement of the transparent and opaque cells. The full mask pattern can be thought of as having elements and these elements having values. The values of the elements can be one of a choice of two possible binary values, the values being either 1 or 0. The aperture is constructed by assigning the transparent cells to one of the values and the opaque cells to another of the values.

The full mask pattern, itself, is generated from a primitive mask pattern based on the mathematical relationships described below. Table I below shows the first seven prime number order skew-Hadamard difference sets and their quadratic residue sequences, B. The above-mentioned element values are generated from these sequences.

TABLE I

| Order v | Quadratic Sequence B |
| --- | --- |
| 3 | 001 |
| 7 | 1000110 |
| 11 | 00010010111 |
| 19 | 0100001100100111101 |
| 23 | 11001010000011110101100 |
| 31 | 1011100001001000110110111100010 |
| 43 | 0111000001000110101100100101001110111110001 |

To illustrate the anti-symmetric characteristic of the sequences, the quadratic sequences are circularly shifted until the first residue resides in the center of the sequence as shown in Table I. The primitive mask pattern, which is a two-dimensional pattern of order v, is generated from the one-dimensional skew-Hadamard quadratic residue sequences, B, according to the following relationship:

$A_{ij}=0$ if i=0

$A_{ij}=1$ if j=0 and i≠0

$A_{ij}=1$ if $B_i=B_j$ $A_{ij}=0$ otherwise where A represents a uniformly redundant array coding function.

Figure 6:
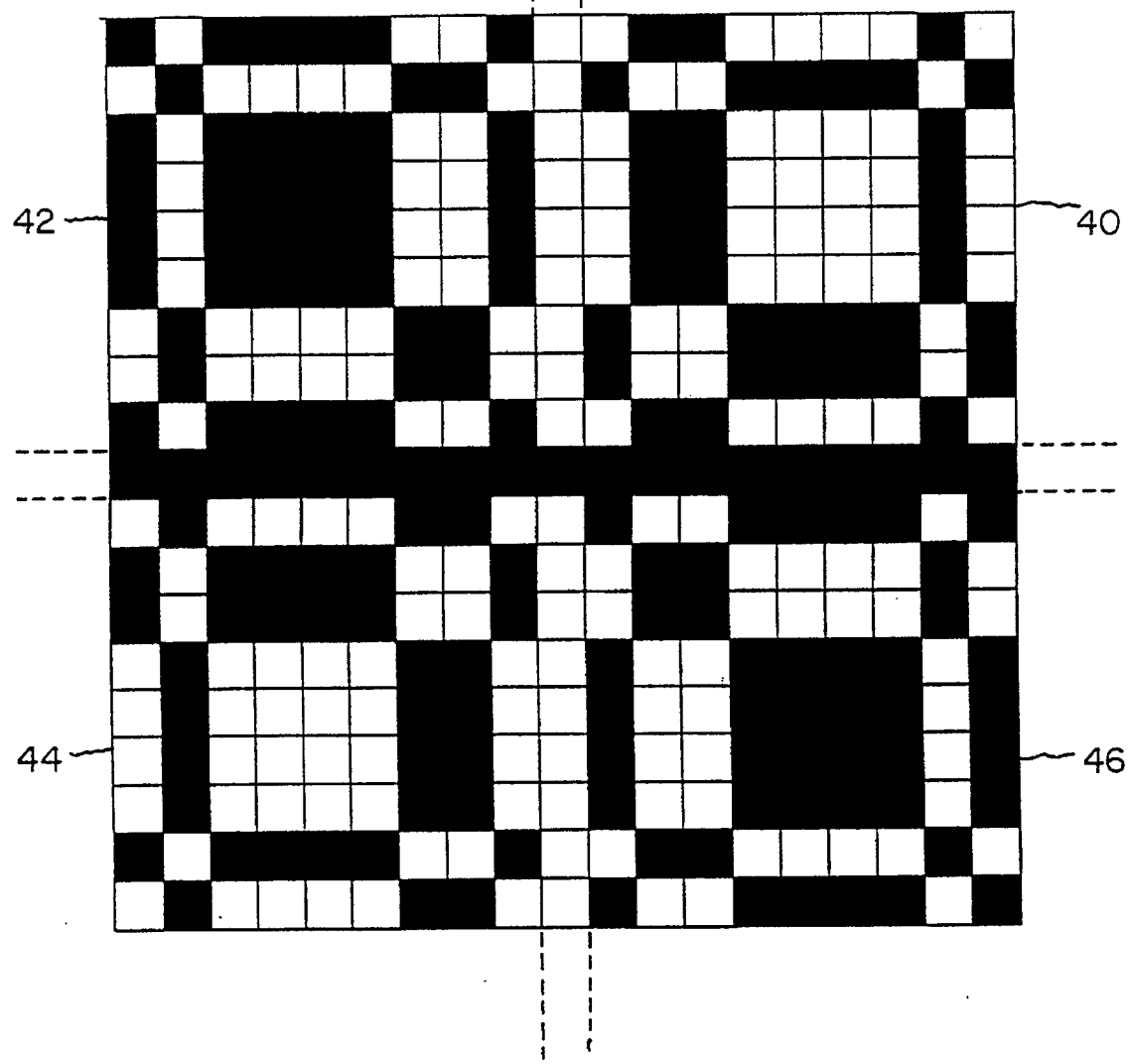
FIG. 6 is a diagrammatic representation of a primitive mask pattern of order 19 formed in accordance with one embodiment of the present invention.

As an example of the primitive mask pattern generated in this manner, FIG. 6 illustrates a primitive mask pattern of order 19. This primitive mask pattern illustrates black elements and white elements, the black elements and white elements ultimately representing opacity and transparency, respectively, on the coded aperture. The dashed lines in FIG. 6 delineate the boundaries of quadrants, the primitive mask pattern having a first quadrant 40, a second quadrant 42, a third quadrant 44, and a fourth quadrant 46. As can be seen, the patterns in the first quadrant 40 and the third quadrant 44 are complementary to the patterns in the second quadrant 42 and the fourth quadrant 46. Thus, the primitive mask pattern is nearly anti-symmetric except for a center element of the primitive pattern and repetitions of the center element. The repetitions of the center element are the individual elements located between quadrants.

Figure 7:
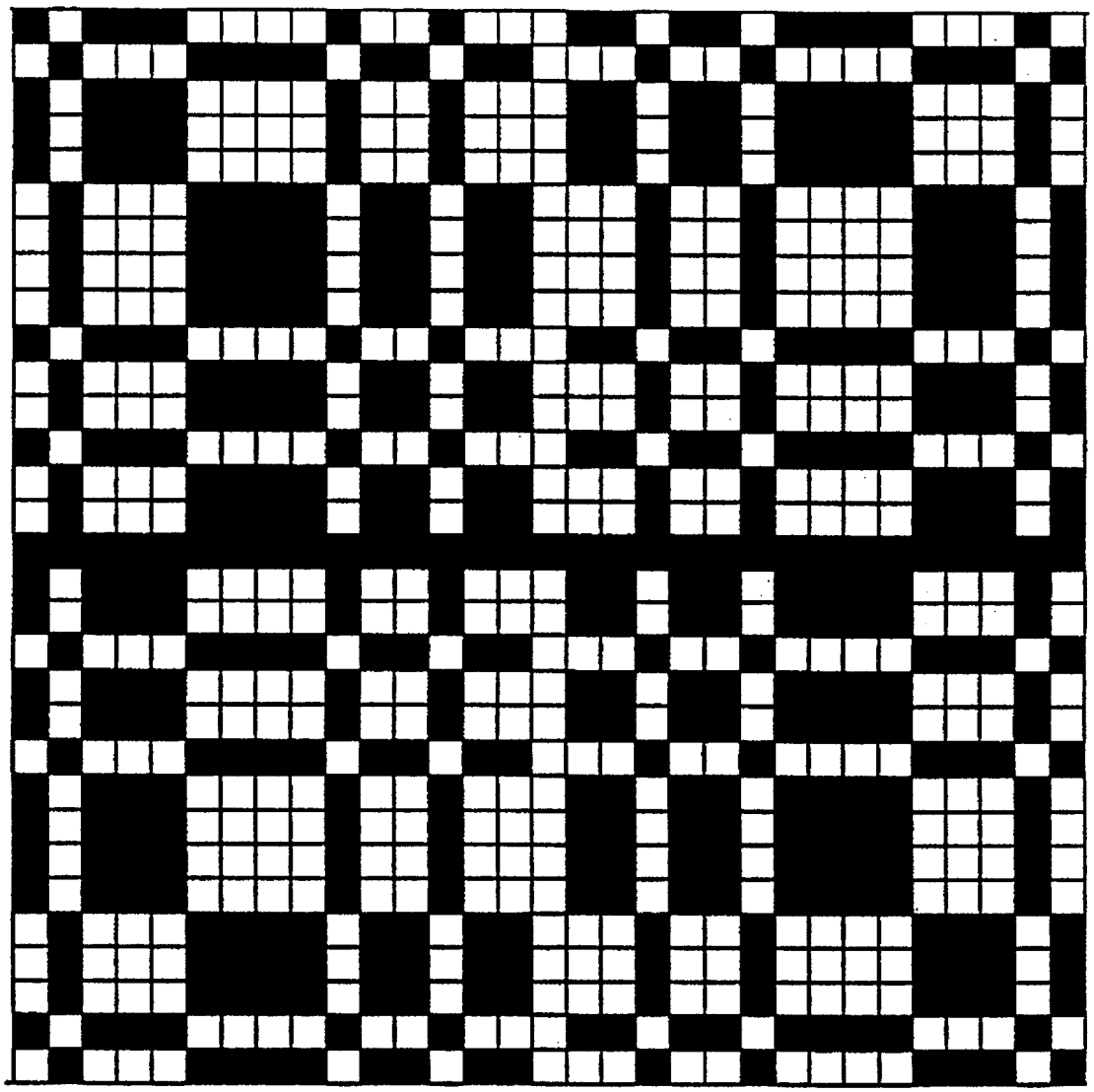
FIG. 7 is a diagrammatic representation of a primitive mask pattern of order 31 formed in accordance with another embodiment of the present invention.

FIG. 7 provides another example of the primitive mask pattern which, in this embodiment, is a primitive mask pattern of order 31. The same complementary relationship between quadrants exists in this pattern as that shown in FIG. 6. It is to be appreciated that, while FIG. 6 and FIG. 7 show two examples for illustrative purposes, the order of the primitive mask pattern may be any prime number belonging to the skew-Hadamard set.

Figure 8A:
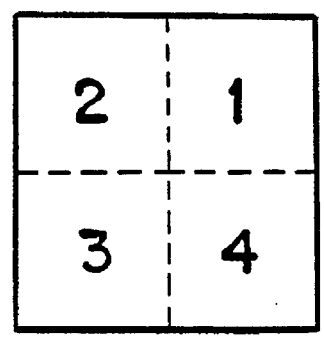
FIG. 8a is a diagrammatic representation of the quadrants associated with a primitive mask pattern of a square anti-symmetric uniformly redundant array coded aperture formed in accordance with the present invention.
Figure 8B:
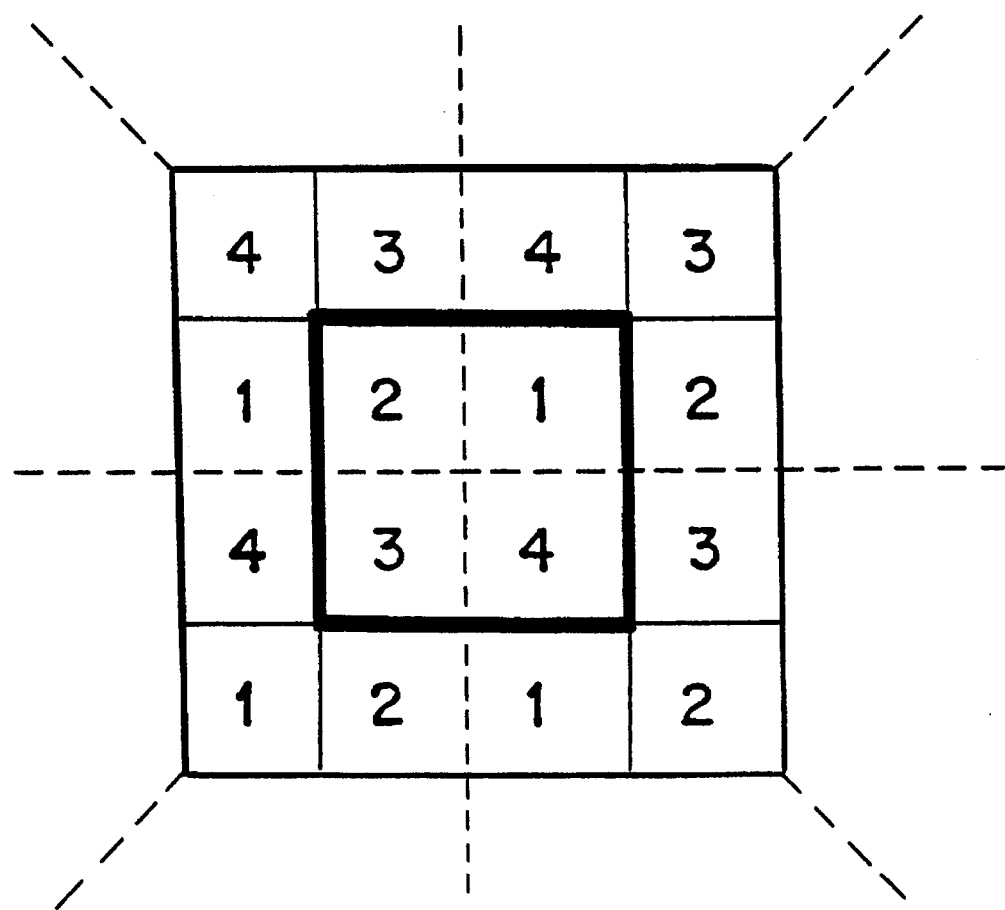
FIG. 8b is a diagrammatic representation of the quadrants associated with a full mask pattern of a square anti-symmetric uniformly redundant array coded aperture formed in accordance with the present invention.
Figure 9:
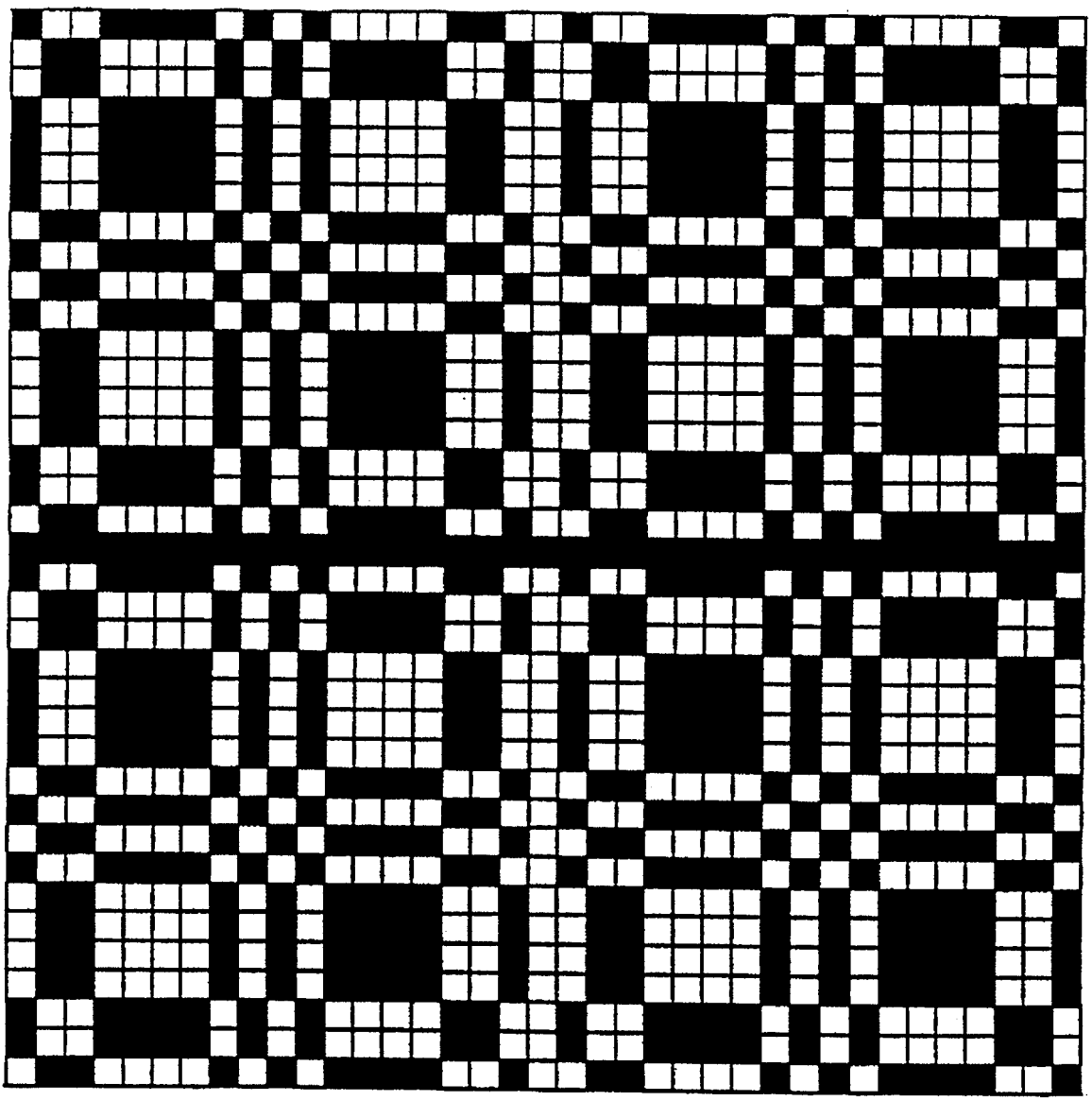
FIG. 9 is a diagrammatic representation of a full mask pattern of a square anti-symmetric uniformly redundant array coded aperture of order 19 formed in accordance with one embodiment of the present invention.
Figure 10:
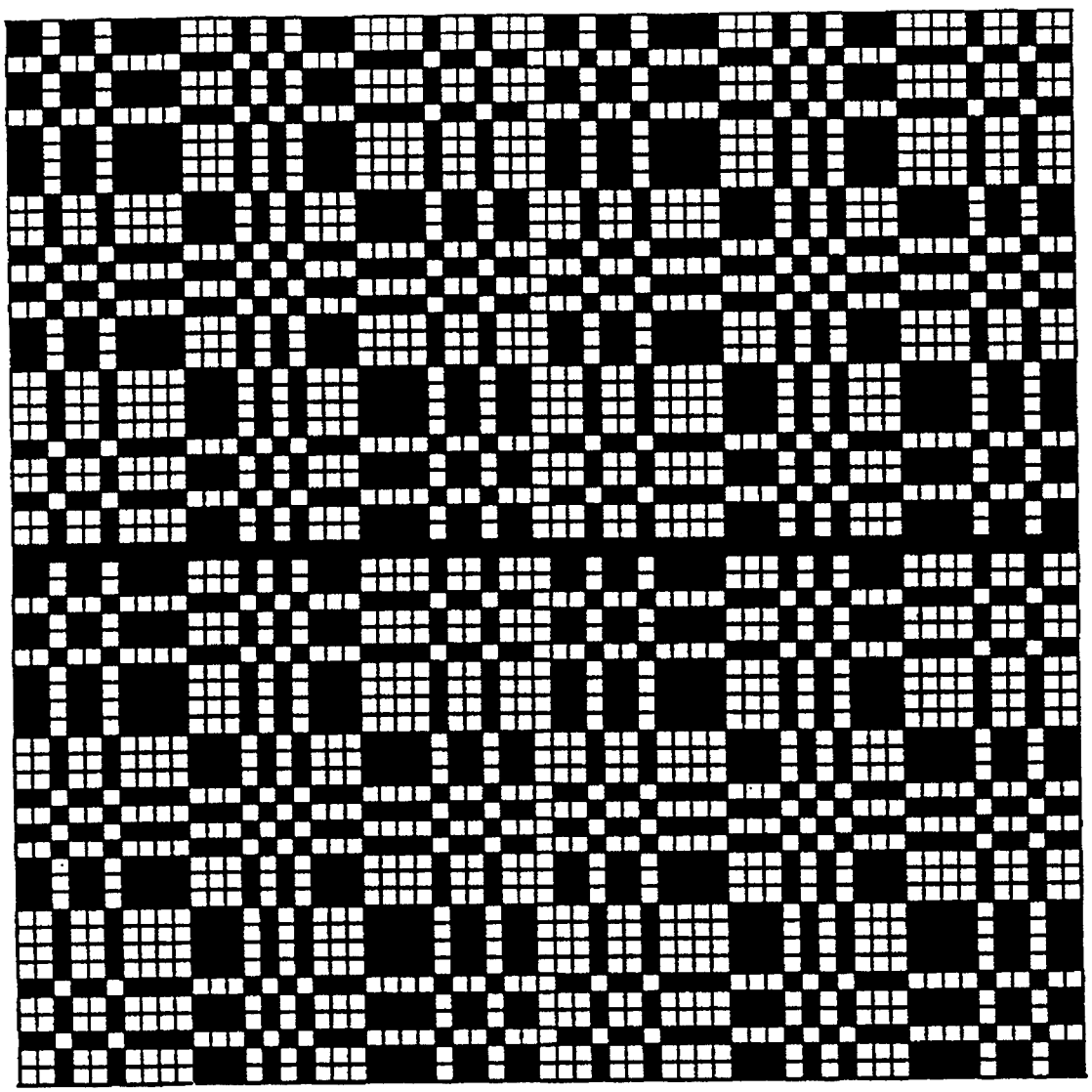
FIG. 10 is a diagrammatic representation of a full mask pattern of a square anti-symmetric uniformly redundant array coded aperture of order 31 formed in accordance with another embodiment of the present invention.

Accordingly, having generated the primitive mask pattern, the full mask pattern of the present invention is generated by repeating the primitive mask pattern diagonally outward from the center of the primitive mask pattern. The resulting full mask pattern includes (2 v−1) ×(2 v−1) elements. FIGS. 8a and 8b diagrammatically illustrate the process of repeating the primitive mask pattern to form the full mask pattern. FIG. 8a shows a representation of the quadrants associated with a primitive mask pattern, being numbered as described above. FIG. 8b shows a representation of the quadrants associated with a full mask pattern generated from the repetition process. It is to be appreciated that, in FIG. 8b, the outline of the primitive mask pattern, located at the center of the full mask pattern, is bolded in order to illustrate its positional relationship. Thus, the resulting locations of corresponding quadrants based on the repetition process are shown in FIG. 8b. For the sake of clarity, spaces between the quadrants for the center element and the repetitions of the center element are not shown in FIG. 8a or 8b. Accordingly, full mask patterns of order 19 and 31, formed in the manner described above, are exemplified in FIGS. 9 and 10, respectively.

Thus, the square anti-symmetric uniformly redundant array coded aperture of the present invention is formed by assigning transparent and opaque cells to the corresponding elements of the full mask pattern. Such a coded aperture generated in the above manner possesses the unique attribute of having one mask pattern at a first position and a second mask pattern, substantially the complement of the first mask pattern, at a second position, the second position being rotationally offset from the first position by 90°. The first and second mask patterns are referred to as a normal mask pattern and a complementary mask pattern, respectively.

Figure 11:
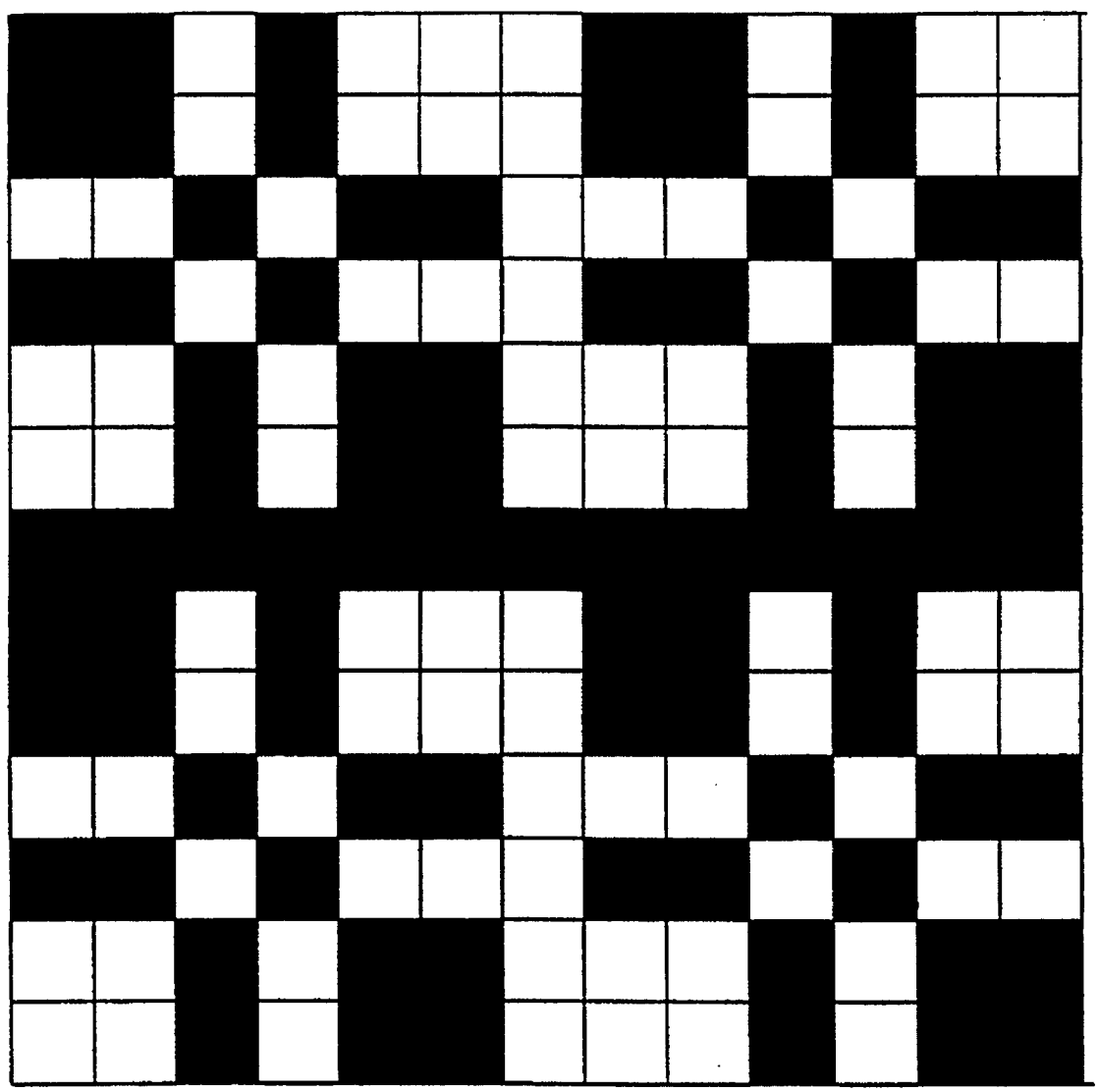
FIG. 11 is a diagrammatic representation of a square anti-symmetric uniformly redundant array coded aperture of order 7 formed in accordance with a third embodiment of the present invention.
Figure 12:
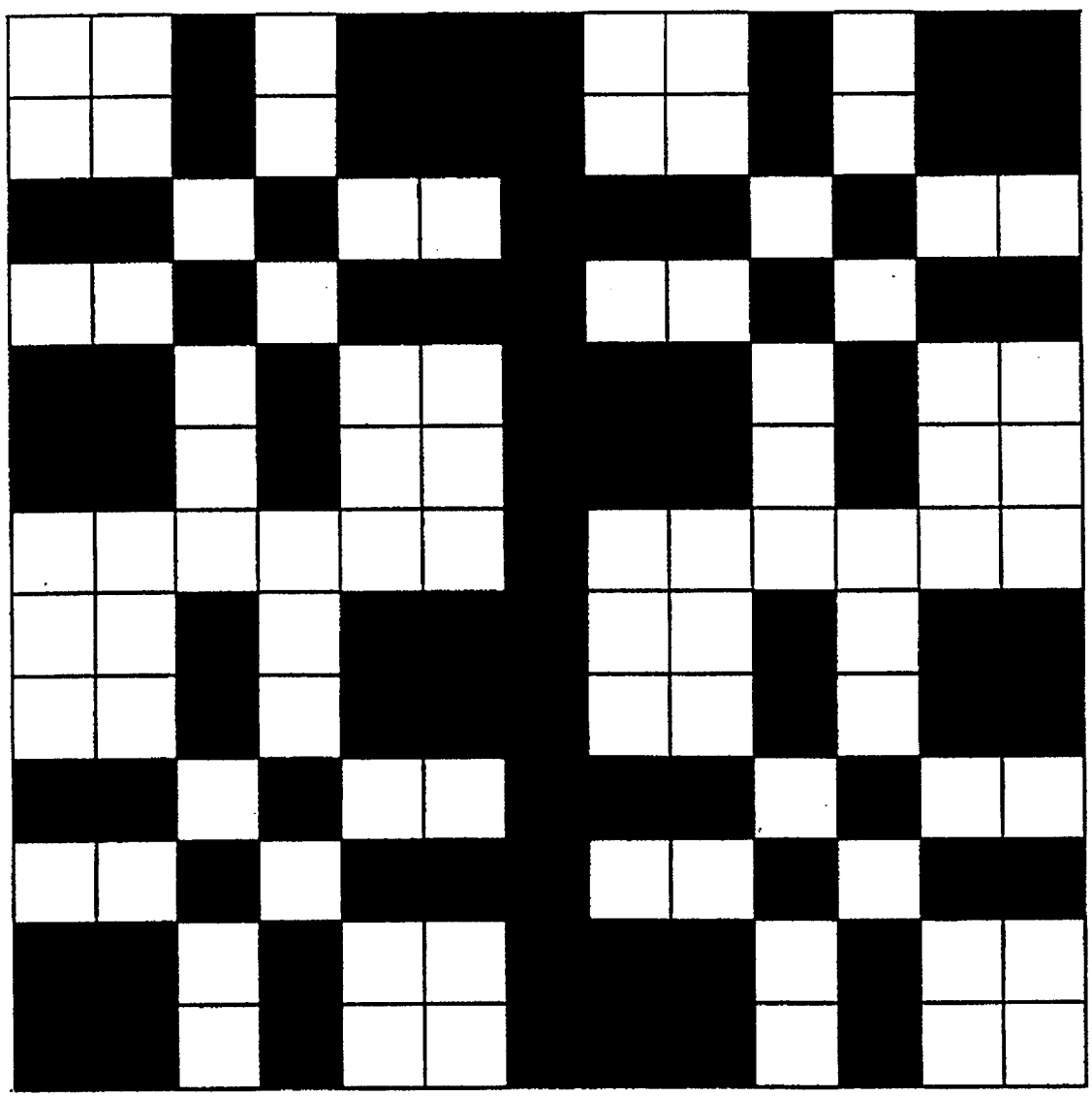
FIG. 12 is a diagrammatic representation of the square anti-symmetric uniformly redundant array coded aperture of FIG. 10, rotated by 90°.

The unique anti-symmetry of the coded aperture formed in accordance with the present invention is illustrated in FIG. 11 and FIG. 12. Referring to FIG. 11, a representation of a square anti-symmetric uniformly redundant array coded aperture of order 7 is shown in a first position exhibiting a normal mask pattern. Now referring to FIG. 12, surprisingly upon 90° rotation of the aperture shown in FIG. 11, the aperture exhibits a complementary mask pattern whereby all the transparent cells exchange positions with all the opaque cells, with the exception of a center cell. The center cell remains consistent whether the coded aperture is exhibiting the normal or complementary mask pattern. Again, it is to be appreciated that the coded aperture of order 7 is merely illustrative of the novel attribute described, and a coded aperture of any prime number order also possessing such unique anti-symmetry may be formed in accordance with the present invention.

A square anti-symmetric uniformly redundant array coded aperture formed in accordance with the present invention may be approximately 4 inches×6 inches and have a thickness of approximately 1 cm to 1.5 cm. Also, the coded aperture may have an aperture opacity of approximately 0.5 to 0.8 at 1.3 Mev.

The advantages of the present invention can further be appreciated by illustrating the use of a square anti-symmetric uniformly redundant array coded aperture formed in accordance with the present invention in a coded aperture imaging system. Thus, a preferred form of such a coded aperture imaging system is shown in FIG. 13.

Figure 13:
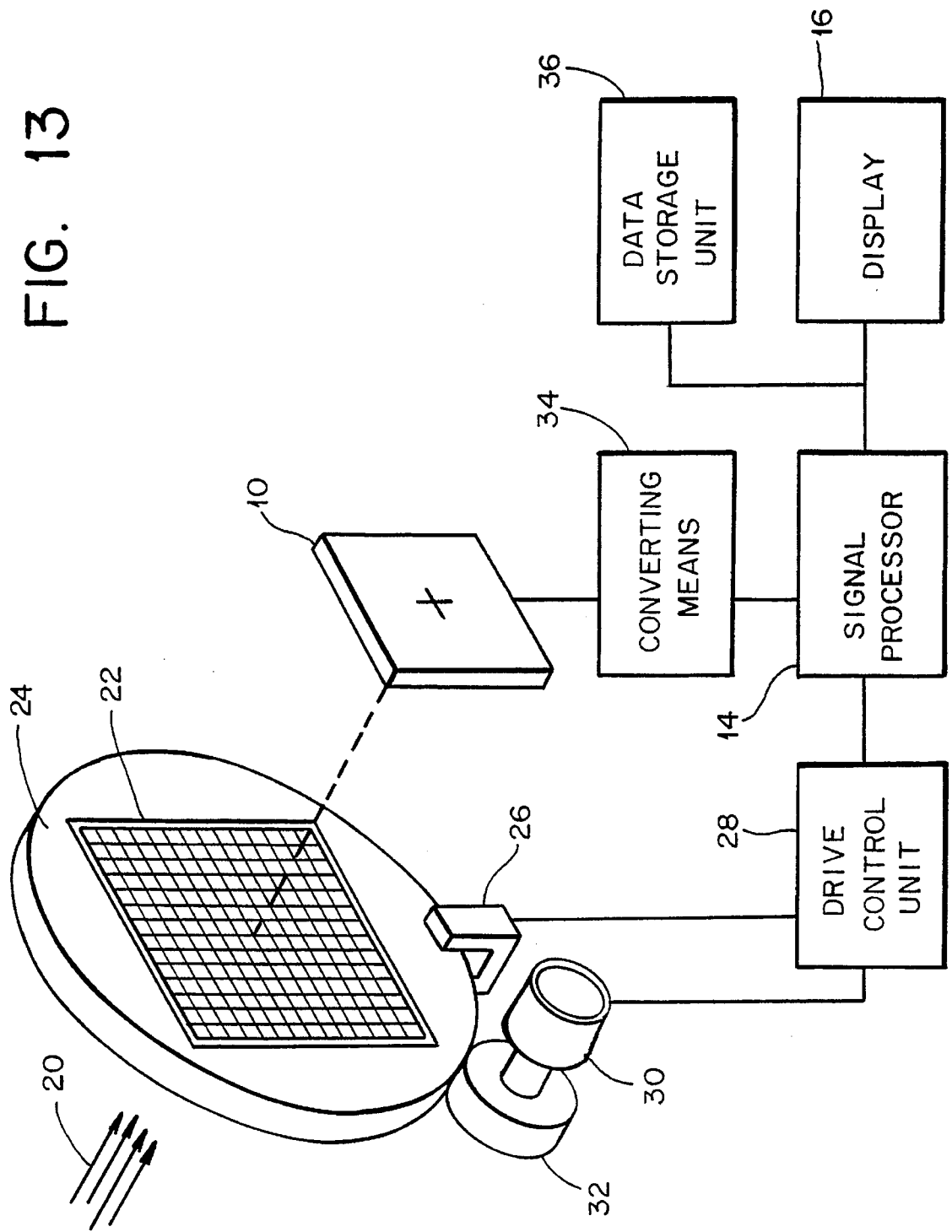
FIG. 13 is a simplified perspective view and block diagram of a square anti-symmetric uniformly redundant array coded aperture imaging system formed in accordance with the present invention.

Referring to FIG. 13, a square anti-symmetric uniformly redundant array coded aperture 22 is centrally mounted on a rotatable aperture retaining platform 24. The platform 24 is disc-shaped, having a circumferential outer surface. A position encoder 26, positioned in close proximity to the rotatable aperture retaining platform 24, encodes an angular position of the platform and thereby generates a position signal. The encoder 26, in one form, optically reads indicia (not shown) circumferentially placed on the platform and encodes the angular position of the platform therefrom. The encoder 26, in another form, includes a sine/cosine potentiometer (not shown) mechanically coupled to the platform, the potentiometer being capable of encoding the angular position of the platform. In a preferred embodiment, the position encoder 26 is an electromechanical (e.g., magnetic) switch which senses the position of the rotatable aperture retaining platform 24 and correspondingly generates the position signal. Further, it is to be appreciated that any encoding means known to one ordinarily skilled in this art may be employed to generate the position signal.

A drive control unit 28 is electrically coupled to the position encoder 26 and to a signal processor 14, the unit being responsive to the position signal. The drive control unit 28 generates a drive control signal. A stepper motor 30 is electrically coupled to the drive control unit 28 and is responsive to the drive control signal. The stepper motor 30 provides a rotational drive force through coupling means 32 to rotate the platform 24. The coupling means 32 is disposed between the stepper motor 30 and the platform 24. In one form, the coupling means 32 includes a meshing spur gear, the gear engaging corresponding gear teeth circumferentially disposed on the platform. The coupling means 32 may alternately include a friction wheel having a circumferential surface contacting the circumferential surface of the platform. In a preferred embodiment, the coupling means 32 includes a belt (not shown) and pulley arrangement whereby rotation of the pulley translates rotational motion to the platform. Again, it is to be appreciated that any coupling means known to one ordinarily skilled in this art may be employed to translate the rotational drive force of the stepper motor to the platform. Also, the functions of the stepper motor 30 and the coupling means 32 may be provided integrally by a stepper unit. In the preferred embodiment of the present invention, the rotating means described above rotates the platform 24, and thus, the square anti-symmetric uniformly redundant array coded aperture 22, from a first position to a second position, the second position being rotationally offset from the first position by 90°. It is to be appreciated that timing control over when to rotate the aperture between the two positions may be performed by either the drive control unit 28 or the signal processor 14.

Further, referring to FIG. 13, a position sensitive detector 10, preferably of Cartesian configuration, is situated in relation to the coded aperture 22 such that non-focusable radiation from a gamma ray or x-ray emitting source is modulated by the coded aperture 22. In accordance with the present invention, the coded aperture 22 is in the first position thereby exhibiting a normal mask pattern. The non-focusable radiation 20 transmits through the coded aperture 22, for some specified time duration. Responsively, the coded aperture 22 generates a first coded shadow, whereby the first coded shadow impinges upon the detector 10. The rotating means then rotates the coded aperture 22 to the second position, the coded aperture 22 thereby exhibiting a complementary mask pattern. The non-focusable radiation 20 again transmits through the coded aperture 22, for approximately an equal time duration. Responsively, the coded aperture 22 generates a second coded shadow, whereby the second coded shadow impinges upon the detector 10. The detector 10, being responsive to the first and second coded shadows, respectively generates first and second coded optical signals.

Optical signal to electrical signal converting means 34 is electrically coupled to the position sensitive detector 10. The converting means 34 may be any means described herein or known to one ordinarily skilled in this art. In one form, the converting means is an array of charge coupled devices. The converting means 34, being responsive to the detector 10, respectively generates first and second coded electrical signals in response to the first and second coded optical signals. The signal processor 14 is electrically coupled to the converting means 34 as well as the drive control unit 28. The signal processor 14 is responsive to the first and second coded electrical signals and the position signal, the position signal being provided to the processor 14 from the position encoder 26 via the drive control unit 28. The signal processor 14 processes these signals and generates an image signal which is representative of an image of the source of non-focusable radiation. This image and other information processed by the signal processor 14, such as photon flux level, exposure time, and measurement conditions, may be displayed on a display 16. A data storage unit 36, electrically coupled to the signal processor 14 and/or the display 16, may store the image signal and the other information processed by the signal processor 14 mentioned above.

It is to be appreciated that the coded aperture imaging system, as illustrated in FIG. 13, may also include means for adjusting the separation distance between the coded aperture 22 and the position sensitive detector 10 similar to the adjusting means illustrated in FIG. 2a.

The imaging process performed by the coded aperture imaging system using a square anti-symmetric uniformly redundant array coded aperture is accomplished in the following manner. The first and second coded electrical signals generated by the converting means 34 are expressed by the correlation of a distribution of the source of non-focusable radiation and a coding function associated with the square anti-symmetric uniformly redundant array coded aperture. Thus, when the coded aperture is in the first position (thereby exhibiting the normal mask pattern), the first coded electrical signal can be described as:

$$O_n = s^* A_n + b_n$$

where * represents a correlation operator, s represents a distributed source function, $b_n$ represents background noise, including all contributions to the detector not modulated by the normal mask pattern of the coded aperture, and $A_n$ represents a normal coding function associated with the normal mask pattern of the coded aperture. Subsequently, when the coded aperture is rotated 90° from the first position to the second position (thereby exhibiting the complementary mask pattern), the second coded electrical signal can be described as:

$$O_c = s^* A_c + b_c$$

where $b_c$ represents background noise, including all contributions to the detector not modulated by the complementary mask pattern of the coded aperture, and $A_c$ represents a complementary coding function associated with the complementary mask pattern of the coded aperture. Subtraction of the above signals yields a resultant signal:

$$O_r = s^*(A_n - A_c) + (b_n - b_c)$$

For the coded aperture of the present invention, the absolute value of $A_n$, the normal coding function, is nearly equal to $A_c$, the complementary coding function, because the two functions are nearly anti-symmetric except for the center cell. In addition, when photon flux is large, it is most probable that $b_n$ is equivalent to $b_c$. Therefore, an average resultant signal can be described as:

$$<O_r> = <s>^*(A_n - A_c) + <b_n - b_c>$$

where <> represents an ensemble average. Thus, the average of the subtracted background noise is substantially equal to zero.

The advantage of a coded aperture imaging system using a square anti-symmetric uniformly redundant array coded aperture is clearly illustrated by the above equation. Such an imaging system provides advantages over all existing imaging systems in that the coded aperture of the present invention, while exhibiting a square-shaped geometry, also effectively negates the detrimental effects of non-modulated photons and instrument background noise.

Further, due to the anti-symmetry of the coded aperture of the present invention, a difference coding function, $A_n-A_c$, is nearly unimodular and is expressed according to the following rules:

$(A_n-A_c)_{ij}=0$ if i=j=0

$(A_n-A_c)_{ij}=1$ if $(A_n)_{ij}=1$, and i+j~0

$(A_n-A_c)_{ij}=-1$ if $(A_n)_{ij}=0$, and i+j~0

An estimate of a reconstructed distribution of the source of non-focusable radiation is represented in the following manner:

$<\hat{s}>=<O_r>=^*G=(<s>^*(A_n-A_c)+<b_n-b_c>)^*G$ where +e,cir +ee represents an estimate of the variable thereunder and where G, a decoding function and a unimodular correlation inverse of $A_{ij}$, is defined as:

$F_{ij}=1$ if i=j=0

$G_{ij}=1$ if $A_{ij}=1$, and i+j~0

$G_{ij}=-1$ if $A_{ij}=0$, and i+j~0

The decoding function, G, is chosen so that the estimate of the decoded source is identical to the source with negligible artifacts. Thus, the relationship between the coding function, A, and the decoding function, G, can be expressed as:

$A^*G=(v^2/2-1)\delta_\kappa$ where $\delta_\kappa$ is a Kronecer delta function.

Accordingly, as demonstrated above, the average background noise level of an imaging system is greatly reduced when the system uses a background suppression scheme by performing normal/complementary subtraction. However, advantageously, the signal-to-noise ratio of a coded aperture imaging system equipped with a square anti-symmetric uniformly redundant array coded aperture does not change substantially whether the normal/complementary background suppression scheme is applied or not, provided that the total exposure time between the normal mask pattern and the complementary mask pattern is equal.

Previously, prior art imaging systems attempting to negate the effects of background noise and non-modulated photons through a normal/complementary aperture approach required physical switching of apertures in order to realize the benefits of normal/complementary processing. Drawbacks, such as system downtime, alignment inaccuracy, and potential radiation exposure to personnel, all served to limit the effectiveness of such prior art systems. Additionally, even prior art systems utilizing a single hexagonal coded aperture, capable of normal/complementary processing, exhibited the severe limitation of only being efficient when equipped with position sensitive detectors of hexagonal or circular geometry. Since most of the state-of-the-art position sensitive detectors are of Cartesian configuration, the coded aperture of the present invention distinctly satisfies the need for a single coded aperture providing normal/complementary processing that can be widely used in the majority of coded aperture imaging systems. Further, because of the normal/complementary nature of the coded aperture of the present invention and the precision rotation capability provided by the accompanying imaging system, system downtime, alignment inaccuracies and risk to personnel are eliminated. Thus, the square anti-symmetric uniformly redundant array coded aperture and a coded aperture imaging system utilizing such a novel aperture overcome all of the limitations of the prior art systems described herein.

Referring now to a description of other components of the coded aperture imaging system, the position sensitive detector 10 of the present invention may be formed from either a crystal scintillator, a plastic fiber scintillator, a glass scintillator, or glass fiber scintillator. In the preferred embodiment, the position sensitive detector is a glass fiber scintillator. A suitable high density glass fiber scintillator for use in the imaging system of the present invention is described in U.S. Pat. No. 5,122,671 to Buchanan, et al., entitled "Terbium Activated Silicate Luminescent Classes For Use In Converting X-Ray Radiation Into Visible Radiation," the disclosure of which is incorporated herein by reference.

The high density glass fiber scintillator emits light in the green spectral region at 534 nm. The glass scintillator may be in the form of either a solid mass of glass scintillating material or in the form of a plurality of glass fibers. In the preferred embodiment, the glass scintillator includes a plurality of fibers and the glass fibers include an external mural absorber coating to minimize the cross-talk between the fibers. The bundle of glass scintillating fibers form the position sensitive detector in the coded aperture imaging system of the present invention.

The glass fiber scintillator is less costly and much more rugged than crystal scintillators commonly known and used in the past. The light output of a 12 mm thick glass scintillator is about 0.2 foot-Lambert per Roentgen per second for 1.3 Mev photons. In the preferred embodiment, each glass scintillating fiber is approximately 15 μm in fiber diameter and the glass fiber assembly is approximately 2 inches to 3 inches in diameter. Typical ranges of suitable thickness of the glass fiber scintillator include from about 1.5 mm to about 12 mm.

The advantages of using the glass fiber scintillator as the position sensitive detector in a coded aperture imaging system are improved signal-to-noise ratio, spatial resolution and dynamic range. More specifically, improved signal-to-noise ratio is achieved to the extent that at high energy, the glass scintillators have shown signal-to-noise ratio improvements approaching a factor of two when compared to gadolinium oxysulfide phosphor screens. Additionally, glass scintillators have improved x-ray attenuation which leads to greater utilization of x-ray photons. With respect to spatial resolution, the glass fiber scintillators exhibit a spatial resolution of 25 line pairs/mm (lp/mm) or better at low x-ray energy. By comparison, a high resolution phosphor screen will display 12–14 lp/mm under similar circumstances. The greater signal capability and reduced light scatter within a position sensitive detector formed from a glass fiber scintillator are both factors which lead to a wide dynamic range capability for the detector. System tests with high performance charge coupled device cameras have exhibited a dynamic range of 3000 or more. This also translates to excellent contrast sensitivity for x-ray inspection applications.

In the preferred embodiment shown in FIG. 2, the coded aperture imaging system includes an optical train 13 or means for transferring the coded optical signal to the array of charge coupled devices. As also shown in FIG. 2, the preferred embodiment includes an image intensifier 11 which is interposed between the position sensitive detector 10 and the array of charge coupled devices 12. More specifically, the position sensitive detector 10 has the side opposite the coded aperture coupled to the coded optical signal transfer means 13. An opposite end of the transfer means is coupled to an image intensifier 11 which amplifies and intensifies the coded optical signal. The amplified coded optical signal is input into the array of charge coupled devices 12 which generates a coded electrical signal in response to the coded optical signal.

The optical train 13 or transfer means for the coded optical signal may be either an array of optical fiber tapers or relay optics. Optical fiber tapers are often used to interface or match two optical apertures of differing size, such as the position sensitive detector 10 and the image intensifier 11 or array of charge coupled devices 12. Optical fiber tapers are generally tapered fiber optics having one end with a larger cross-sectional area than the opposite end of the optical fiber. The alternative configuration of the coded aperture imaging system uses relay optics to image the output surface of the glass fiber scintillator to the image intensifier or array of charge coupled devices 12. Both the fiber optic tapers and relay optics are special order commercially available products. For example, suitable fiber optic tapers include special order fiber optics manufactured by Schott Fiber Optics, Inc.

As previously mentioned, the image intensifier 11 amplifies and intensifies the coded optical signal. The array of charge coupled devices 12 are responsive to the amplified coded optical signal and generate a coded analog electrical signal in response to the coded optical signal. The image intensifier 11 can be any number of commercially available products such as an image intensifier tube manufactured by Hamamatsu Photonics K.K. having model number V33347U. Alternatively, the image intensifier function may be accomplished by an array of semiconductor photodiodes such as those manufactured by Hamamatsu Photonics K.K. having model number S2461.

In the coded aperture imaging system, the array of charge coupled devices 12 converts the amplified coded optical signal into a coded multiplexed analog electrical signal. The coded analog electrical signal may be processed internally by a signal processor/decoder or at a remote location as shown in FIG. 1. Accordingly, a hand-held device including at least the coded aperture 4, the position sensitive detector 10 and the array of charge coupled devices 12 may be housed within a portable protective case 2. A cable 8 having one end coupled to the array of charge coupled devices 12 and an opposite end coupled to a remote image processor completes the coded aperture imaging system. The coded analog electrical signal is conveyed via the cable 8 to the signal processor which digitizes, formats and decodes the coded analog electrical signal and generates an image signal which is representative of an image of a gamma ray emitting source.

As previously mentioned, an alternative embodiment of the present invention includes an array of semiconductor photodiodes which are responsive to the coded optical signal. The array of semiconductor photodiodes generates a coded electrical signal in response to the coded optical signal. Additionally, the array of photodiodes performs the function of the image intensifier to amplify the optical signal prior to converting the optical signal to an electrical signal. Accordingly, the imaging system operates in a similar manner to that previously described.

The coded aperture imaging system minimum detectable dosage or sensitivity is a function of the glass fiber scintillator, the image intensifier, the array of charge coupled devices and the aperture design. Since the numerical aperture of the glass fiber scintillator is less than the commonly used optical fibers comprising the optical fiber tapers, light emitted by the scintillator is coupled to the optical fiber tapers without any reflection. If a 1.5 inch diameter image intensifier tube was used, an optical fiber taper with approximately 2×magnification can be used to match the glass fiber scintillator to the image intensifier tube. Assuming an 80 percent optical transmission, transmission through a 2×magnification optical fiber taper will be reduced to about 50 percent because of excessive magnification and propagation losses in the fiber optic tapers. Therefore, assuming a typical current response of 0.04 A/W for the input phosphor, a gain of 10,000, and a P20 output phosphor for an image intensifier tube, the responsivity of the coded aperture imaging system detector comprising a 3-inch glass fiber scintillator, a 2×fiber optic taper and a 1.5 inch image intensifier tube is about $1\times10^{-3}$w-sec/cm$^2$-roentgen.

In the preferred embodiment using an array of charge coupled devices, the noise equivalent irradiance of the array of charge coupled devices may be reduced by cooling the array with a two-stage thermoelectrical cooler. Typically, operating arrays of charge coupled devices operating at 16 frames per second have a noise equivalent irradiance of about $2.5\times10^{-19}$w-cm$^{-2}$. By cooling the array of charge coupled devices, the noise equivalent irradiance is reduced to about $6.5\times10^{-12}$w-cm$^{-2}$. If an 80 percent coupling efficiency between the image intensifier tube and the array of charge coupled devices is achieved, the sensitivity of the coded aperture imaging system for 1.3 Mev photons is approximately 3 μroentgen/sec or 10 mr/hr when operating at 16 frames per second. The sensitivity reduces to about 5 nr/sec or 10 μr when operating at 1 frame per second. The array of charge coupled devices is commercially available from a number of manufacturers. A suitable array of charge coupled devices for use in the present invention is manufactured by Eastman Kodak Company and has Model Number KAI-0370.

Additionally, the sensitivity of the coded aperture imaging system may be further improved by several means including usage of multistage image intensifier tubes or high gain silicon avalanche photo diode arrays, or even multiplexing with several optical fiber tapers and image intensifier tubes which will improve the sensitivity by one or two orders of magnitude. Application of a scanning linear avalanche photo diode array can also provide better sensitivity with an increased frame and integration time.

The signal processor 14 used for decoding the coded electrical signal and generating an image signal is preferably a digital signal processor. The signal processor digitizes, formats and decodes the coded multiplexed analog electrical signal generated by the array of charge coupled devices and generates an image signal therefrom. The decoding algorithm preformed by the signal processor is dependent upon the aperture configuration. In the preferred embodiment the signal processor is part of a radiation hardened digital signal processor module. The radiation hardened digital signal processor module includes a complete digital signal processor mounted on a Versa module Europa sized (6U) double-sided leaded chip carrier module. The radiation hardened digital signal processor module performs high speed floating and fixed point arithmetic problems while acting as a system controller. A suitable radiation hardened digital signal processor is based upon the Texas Instruments Hardened Ada Signal Processor (HASP) chip as the core digital signal processor.

The radiation hardened digital signal processor provides 32K×32 of reprogrammable EEPROM memory, 4K of which is reserved for a boot-up routine. The processor further includes a random access memory (RAM) totaling 384K×32 which is divided into two sections. The first 128K×32 is a zero wait state. The remaining 256K×32 requires one wait state. Memories are accessible via a 32-bit primary bus. Means of communicating between multiple processor modules is provided via a 32-bit wide dual port memory "mailbox" on the expansion bus of each module. Using master/slave protocol, the master has full control of the mailbox. The master is capable of broadcasting a message to one or all of the slaves simultaneously. The slaves only write and read from their own mailboxes and indicate to the master when mail is to be picked up. A wraparound capability is preferably provided for self-test purposes and can be used by the master to monitor outgoing messages. All module input/output signals are buffered in a manner such that a module can be powered off without any adverse effects.

As discussed throughout the detailed description, the coded aperture imaging system formed in accordance with the present invention may be made using a variety of commercially available devices depending upon the system requirements. The coded aperture imaging system can be optimized for the specific use intended, which could encompass a wide range of radiation fields. For example, the ranges may be for imaging small amounts of radiation such as environment and decommissioning residuals or operational ranges for imaging post accident situations, which may be far greater than the extremes of the operational ranges. Additionally, the coded aperture imaging system of the present invention provides the following advantageous features: (1) portability; (2) a large field of view; (3) a zooming capability without loss of resolution for detailed mapping; (4) high sensitivity and wide dynamic range; (5) real-time operation; and (6) operation and display of images and results at remote locations.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A square anti-symmetric uniformly redundant array coded aperture for imaging a source of non-focusable radiation, the coded aperture comprising transparent cells and opaque cells and exhibiting a full mask pattern, the full mask pattern having elements, the elements having values including a first value and a second value, the transparent cells and the opaque cells being respectively assigned locations corresponding to the elements having the first value and the second value, the full mask pattern being generated from a primitive mask pattern of order v, having a center, the primitive mask pattern being defined by a relationship:

$A_{ij}=0$ if i=0

$A_{ij}=1$ if j=0 and i~0

$A_{ij}=1$ if $B_i=B_j$ $A_{ij}=0$ otherwise where A is a uniformly redundant array coding function and B is a skew-Hadamard quadratic residue sequence, the full mask pattern being constructed by repeating the primitive mask pattern diagonally outward from the center of the primitive mask pattern whereby the full mask pattern includes a total of (2 v−1)×(2 v−1) elements.

2. A square anti-symmetric uniformly redundant array coded aperture for imaging a source of non-focusable radiation, the coded aperture comprising transparent and opaque cells, the coded aperture being positionable in a first position and a second position rotatably offset from the first position by 90°, the coded aperture exhibiting a square normal mask pattern at the first position, the coded aperture exhibiting a square complementary mask pattern at the second position whereby substantially all of the opaque cells exchange locations with substantially all of the transparent cells.

3. A method of constructing a square anti-symmetric uniformly redundant array coded aperture for imaging a source of non-focusable radiation, the coded aperture having transparent cells and opaque cells, the method comprising the steps of:

generating a primitive mask pattern of order v, having a center, the primitive mask pattern being defined by a relationship:

$A_{ij}=0$ if i=0

$A_{ij}=1$ if j=0 and i~0

$A_{ij}=1$ if $B_i=B_j$ $A_{ij}=0$ otherwise where A is a uniformly redundant array coding function and B is a skew-Hadamard quadratic residue sequence;

generating a full mask pattern having elements, the elements having values including a first value and a second value, the full mask pattern being generated by repeating the primitive mask pattern diagonally outward from the center of the primitive mask pattern whereby the full mask pattern includes a total of (2 v−1)×(2 v−1) elements; and assigning the transparent cells and the opaque cells, respectively, to the elements of the full mask pattern having the first value and the second value.

4. A coded aperture imaging system for imaging a source of non-focusable radiation, the system comprising:

a coded aperture, the coded aperture including transparent cells and opaque cells, the coded aperture being positionable in a first position and a second position rotationally offset from the first position by 90°, the coded aperture exhibiting a square normal mask pattern at the first position, the coded aperture exhibiting a square complementary mask pattern at the second position whereby substantially all of the opaque cells exchange locations with substantially all of the transparent cells;

means for rotating the coded aperture between the first position and the second position, the coded aperture receiving non-focusable radiation emitted by the source at both the first position and the second position, the coded aperture generating a first coded shadow in response to the radiation received when the coded aperture is at the first position, the coded aperture generating a second coded shadow in response to the radiation received when the coded aperture is at the second position;

a position sensitive detector situated with respect to the coded aperture to allow the first coded shadow and the second coded shadow to sequentially impinge thereon, the position sensitive detector respectively generating a first coded optical signal and a second coded optical signal in response to the first coded shadow and the second coded shadow sequentially impinging thereon;

means for converting an optical signal to an electrical signal, the converting means being responsive to the first coded optical signal and the second coded optical signal and respectively generating a first coded electrical signal and a second coded electrical signal in response thereto; and a signal processor, the signal processor being responsive to the first coded electrical signal and the second coded electrical signal and decoding the first coded electrical signal and the second coded electrical signal, the signal processor generating an image signal therefrom, the image signal being representative of an image of the source of non-focusable radiation.

5. A coded aperture imaging system as defined in claim 4, wherein the rotating means comprises:

an aperture retaining platform, the platform being positionable in an at least first position and an at least second position, the coded aperture being mounted on the platform;

a position encoder, the encoder being operatively coupled to the platform, the encoder being responsive to the rotational position of the platform and generating a position signal in response thereto, the position signal indicating whether the platform is in the at least first position or the at least second position;

a drive control unit, the drive control unit being electrically coupled to the position encoder, the drive control unit being responsive to the position signal and generating a drive control signal in response thereto; and a stepper unit, the stepper unit being electrically coupled to the drive control unit and mechanically coupled to the platform, the stepper unit being responsive to the drive control signal and rotating the platform between the at least first position and the at least second position in response thereto.

6. A coded aperture imaging system as defined in claim 5, wherein the position encoder is electrically coupled to the signal processor, the signal processor being responsive to the position signal of the position encoder, the signal processor processing the position signal, the first coded electrical signal and the second coded electrical signal and thereby generating the image signal.

7. A coded aperture imaging system as defined in claim 4, further comprising a display, the display being electrically coupled to the signal processor, the display including a visual representation of an area in the field of view of the imaging system and wherein the representative image of the source of non-focusable radiation responsive to the image signal is superimposed on the visual representation.

8. A coded aperture imaging system as defined in claim 4, further comprising a data storage unit, the data storage unit being electrically coupled to the signal processor, the signal processor generating data signals, the data storage unit storing the data signals from the signal processor.

9. A coded aperture imaging system as defined in claim 4, further comprising means for adjusting a separation distance between the coded aperture and the position sensitive detector, the adjusting means being operatively coupled to at least one of the coded aperture and the position sensitive detector, the adjusting means moving at least one of the coded aperture and the position sensitive detector with respect to the other thereby adjusting the separation distance.

* * * * *

UNITED STATES PATENT AND TRADEMARK OFFICE
CERTIFICATE OF CORRECTION

PATENT NO. : 5,606,165
DATED : February 25, 1997
INVENTOR(S) : Chiou, et. al.

It is certified that error appears in the above-indentified patent and that said Letters Patent is hereby corrected as shown below:

| | |
|---|---|
| Column 12, line 19, | now reads "It" and should read --It is--; |
| Column 12, line 20, | now reads "It" (new paragraph) and should read -- possible to associate, to each different set, a -- (no new paragraph); |
| Column 12, line 38, | now reads "(mod", should read --(mod $\upsilon$)--; |
| Column 13, line 31, | now reads "i~0", should read --$i \neq 0$--; |
| Column 17, line 18, | now reads "i+j~0", should read --$i + j \neq 0$--; |
| Column 17, line 21, | now reads "i+j~0", should read --$i + j \neq 0$--; |
| Column 17, line 34, | now reads "i+j~0", should read --$i + j \neq 0$--; |
| Column 17, line 36, | now reads "i+j~0", should read --$i + j \neq 0$--; and |

UNITED STATES PATENT AND TRADEMARK OFFICE
CERTIFICATE OF CORRECTION

PATENT NO. : 5,606,165
DATED : February 25, 1997
INVENTOR(S) : Chiou, et. al.

It is certified that error appears in the above-indentified patent and that said Letters Patent is hereby corrected as shown below:

<u>Column 21, line 65,</u>    now reads "i~0", should read --$i \neq 0$--; and

<u>Column 22, line 29,</u>    now reads "i~0", should read --$i \neq 0$--.

Signed and Sealed this

Twenty-ninth Day of July, 1997

Attest:

BRUCE LEHMAN

Attesting Officer          Commissioner of Patents and Trademarks

(12) EX PARTE REEXAMINATION CERTIFICATE (7598th)

United States Patent
Chiou et al.

(10) Number: US 5,606,165 C1
(45) Certificate Issued: Jul. 13, 2010

(54) SQUARE ANTI-SYMMETRIC UNIFORMLY REDUNDANT ARRAY CODED APERTURE IMAGING SYSTEM

(75) Inventors: Walter C. Chiou, North Babylon, NY (US); Richard C. Augeri, West Hempstead, NY (US)

(73) Assignee: AIL Systems, Inc., New York, NY (US)

Reexamination Request:
No. 90/010,573, Jun. 11, 2009

Reexamination Certificate for:
Patent No.: 5,606,165
Issued: Feb. 25, 1997
Appl. No.: 08/586,555
Filed: Jan. 16, 1996

Certificate of Correction issued Jul. 29, 1997.

Related U.S. Application Data

(63) Continuation-in-part of application No. 08/154,733, filed on Nov. 19, 1993, now abandoned.

(51) Int. Cl.
  *G01T 1/29* (2006.01)
  *G01T 1/00* (2006.01)
  *G01T 1/167* (2006.01)

(52) U.S. Cl. .................................. 250/363.06; 382/281
(58) Field of Classification Search ........................ None
  See application file for complete search history.

(56) References Cited

U.S. PATENT DOCUMENTS 4,209,780 A    6/1980    Fenimore et al.

OTHER PUBLICATIONS

Gottesman, S.R. and Fenimore, E. E. "New Family of Binary Arrays for Coded Aperture Imaging," Applied Optics, Vo. 28, No. 20 (1989).
Byard, K. "Square Element Antisymmetric Coded Apertures," Experimental Astronomy 2: 227–232 (1992).
Braga et al. "A new Mask–Antimask Coded–Aperture Telescope for Hard X–Ray Astronomy," Experimental Astronomy 2: 101–113 (1991).
Finger, M. H. and Prince, T. A. In NASA. Goddard Space Flight Center 19th Intern. Cosmic Ray Conf., vol. 3, p. 295–298 (1985).
Finger, M. H. "The Imaging of Extra–Galactic Low–Energy Gamma–Ray Sources: Prospects, Techniques, and Instrumentation." Thesis, Pasadena, CA: California Institute of Technology (1988).
Cook et al.; "Coded–Aperture Imaging of the Galactic Center Region at Gamma–Ray Energies." The Astrophysical Journal, 372: L75–L78 (May 1991).
Ziock et al., "A Gamma–Ray Imager for Arms Control." IEEE Transactions on Nuclear Science, vol. 39, No. 4 (Aug. 1992).

*Primary Examiner*—Christopher E Lee

(57) ABSTRACT

A square anti-symmetric uniformly redundant array coded aperture includes transparent and opaque cells and exhibits a normal mask pattern at a first position and a complementary mask pattern when rotated to a second position rotationally offset by 90° from the first position. The coded aperture is utiized in a coded aperture imaging system for imaging a source of non-focusable radiation such as a gamma ray or x-ray emitting source. Such a coded aperture imaging system basically includes a square anti-symmetric uniformly redundant array coded aperture for receiving radiation emitted by a source and generating a first coded shadow therefrom at the first position, and a second coded shadow therefrom at the second position, a rotating platform and motor for rotating the coded aperture between the first and second position, a position sensitive detector situated with respect to the coded aperture to allow the first and second coded shadows to sequentially impinge on the detector, the detector respectively generating a first coded optical signal and a second coded optical signal in response thereto, an optical signal convertor responsive to the first and second coded optical signals and respectively generating a first coded electrical signal and a second coded electrical signal in response thereto and a signal processor responsive to the first and second coded electrical signals and decoding the coded electrical signals to generate an image signal which is representative of an image of the source of non-focusable radiation.

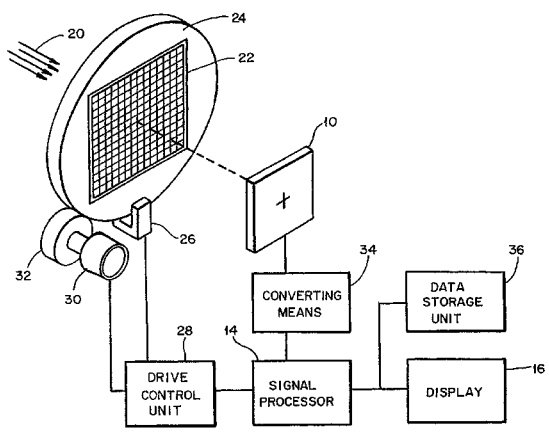

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4-9 is confirmed.

Claims 1-3 are cancelled.

\* \* \* \* \*

(12) EX PARTE REEXAMINATION CERTIFICATE (8854th)
United States Patent
Chiou et al.

(10) Number: US 5,606,165 C2
(45) Certificate Issued: Feb. 14, 2012

(54) SQUARE ANTI-SYMMETRIC UNIFORMLY REDUNDANT ARRAY CODED APERTURE IMAGING SYSTEM

(75) Inventors: Walter C. Chiou, North Babylon, NY (US); Richard C. Augeri, West Hempstead, NY (US)

(73) Assignee: AIL Systems Inc., New York, NY (US)

Reexamination Request:
No. 90/011,114, Jul. 26, 2010

Reexamination Certificate for:
Patent No.: 5,606,165
Issued: Jul. 13, 2010
Appl. No.: 08/586,555
Filed: Jan. 16, 1996

Reexamination Certificate B1 5,606,165 issued Feb. 25, 1997

Certificate of Correction issued Jul. 29, 1997.

Related U.S. Application Data

(63) Continuation-in-part of application No. 08/154,733, filed on Nov. 19, 1993, now abandoned.

(51) Int. Cl.
G01T 1/29 (2006.01)
G01T 1/00 (2006.01)
G01T 1/167 (2006.01)

(52) U.S. Cl. .................................. 250/363.06; 382/281
(58) Field of Classification Search .............. 250/363.06
See application file for complete search history.

(56) References Cited

To view the complete listing of prior art documents cited during the proceeding for Reexamination Control Number 90/011,114, please refer to the USPTO's public Patent Application Information Retrieval (PAIR) system under the Display References tab.

*Primary Examiner* — Pia Tibbits

(57) ABSTRACT

A square anti-symmetric uniformly redundant array coded aperture includes transparent and opaque cells and exhibits a normal mask pattern at a first position and a complementary mask pattern when rotated to a second position rotationally offset by 90° from the first position. The coded aperture is utilized in a coded aperture imaging system for imaging a source of non-focusable radiation such as a gamma ray or x-ray emitting source. Such a coded aperture imaging system basically includes a square anti-symmetric uniformly redundant array coded aperture for receiving radiation emitted by a source and generating a first coded shadow therefrom at the first position, and a second coded shadow therefrom at the second position, a rotating platform and motor for rotating the coded aperture between the first and second position, a position sensitive detector situated with respect to the coded aperature to allow the first and second coded shadows to sequentially impinge on the detector, the detector respectively generating a first coded optical signal and a second coded optical signal in response thereto, an optical signal convertor responsive to the first and second coded optical signals and respectively generating a first coded electical signal and a second coded electrical signal in response thereto and a signal processor responsive to the first and second coded electrical signals and decoding the coded electrical signals to generate an image signal which is representative of an image of the source of non-focusable radiation.

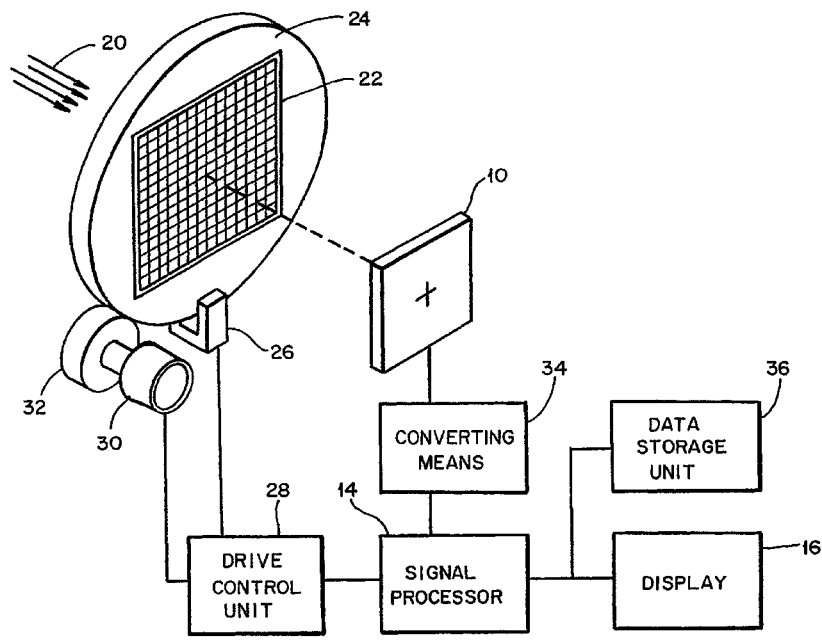

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 7 is confirmed

Claims 1-3 were previously cancelled.

Claims 4-6, 8 and 9 are cancelled.

* * * * *